(12) United States Patent
Miyakoshi et al.

(10) Patent No.: US 11,506,423 B2
(45) Date of Patent: Nov. 22, 2022

(54) VEHICLE AIR-CONDITIONING APPARATUS

(71) Applicant: SANDEN AUTOMOTIVE CLIMATE SYSTEMS CORPORATION, Isesaki (JP)

(72) Inventors: Ryo Miyakoshi, Isesaki (JP); Kouhei Yamashita, Isesaki (JP); Tetsuya Ishizeki, Isesaki (JP)

(73) Assignee: SANDEN AUTOMOTIVE CLIMATE SYSTEMS CORPORATION, Gunma (JP)

( * ) Notice: Subject to any disclaimer, the term of this patent is extended or adjusted under 35 U.S.C. 154(b) by 665 days.

(21) Appl. No.: 16/476,958

(22) PCT Filed: Jan. 12, 2018

(86) PCT No.: PCT/JP2018/001476
§ 371 (c)(1),
(2) Date: Jul. 10, 2019

(87) PCT Pub. No.: WO2018/139342
PCT Pub. Date: Aug. 2, 2018

(65) Prior Publication Data
US 2019/0353407 A1 Nov. 21, 2019

(30) Foreign Application Priority Data
Jan. 30, 2017 (JP) .............................. JP2017-014505

(51) Int. Cl.
*B60H 1/00* (2006.01)
*F25B 1/00* (2006.01)
*B60H 1/22* (2006.01)

(52) U.S. Cl.
CPC ............. *F25B 1/00* (2013.01); *B60H 1/0005* (2013.01); *B60H 1/2225* (2013.01); *B60H 2001/2228* (2013.01)

(58) Field of Classification Search
None
See application file for complete search history.

(56) References Cited

U.S. PATENT DOCUMENTS 5,598,887 A * 2/1997 Ikeda .................. B60H 1/3207
165/202
2015/0306939 A1* 10/2015 Miyakoshi ........... B60H 1/3213
62/160

FOREIGN PATENT DOCUMENTS

CN 104822552 8/2015
CN 104822553 8/2015
(Continued)

OTHER PUBLICATIONS

Atsuo Inoue, Air conditioner for vehicle (Translated) (Year: 1996).*
(Continued)

*Primary Examiner* — Vivek K Shirsat
*Assistant Examiner* — Ko-Wei Lin
(74) *Attorney, Agent, or Firm* — Cozen O'Connor

(57) ABSTRACT

A vehicle air-conditioning apparatus is provided which is capable of expanding an effective range of a dehumidifying and heating mode to achieve comfortable vehicle interior air conditioning. A control device (controller) executes a dehumidifying and heating mode to let a refrigerant discharged from a compressor 2 radiate heat in a radiator 4, let a part of the refrigerant flow from a bypass circuit (refrigerant pipe 13F) to an indoor expansion valve 8, and let the residual refrigerant flow through an outdoor expansion valve 6. In the dehumidifying and heating mode, the control device has a state of controlling the operation of the compressor 2, based on a heat absorber temperature Te and executes a radiator temperature priority mode which enlarges a capability of the compressor when heat radiation in the radiator is insufficient.

11 Claims, 9 Drawing Sheets

(56) References Cited

FOREIGN PATENT DOCUMENTS

| | | | | |
|---|---|---|---|---|
| CN | 105579259 | 5/2016 | | |
| CN | 106232400 | 12/2016 | | |
| JP | 08282262 A | * 10/1996 | ............... | B60H 1/32 |
| JP | 2014-094673 | 5/2014 | | |
| JP | 2016-064704 | 4/2016 | | |
| JP | 2016-068687 | 5/2016 | | |
| JP | 2017-007593 | 1/2017 | | |
| WO | WO 2014/073688 | 5/2014 | | |
| WO | WO 2016/047950 | 3/2016 | | |

OTHER PUBLICATIONS

Office Action dated Mar. 10, 2022 issued in Chinese Patent Application No. 201880007479.8.

* cited by examiner

VEHICLE AIR-CONDITIONING APPARATUS

RELATED APPLICATIONS

This is a U.S. National Phase Application under 35 USC 371 of International Application PCT/JP2018/001476 filed on Jan. 12, 2018.

This application claims the priority of Japanese application no. 2017-014505 filed Jan. 30, 2017, the entire content of which is hereby incorporated by reference.

TECHNICAL FIELD

The present invention relates to an air conditioning apparatus of a heat pump type which conditions air in a vehicle interior of a vehicle, and particularly to a vehicle air-conditioning apparatus suitable for a hybrid car and an electric car.

BACKGROUND ART

Due to actualization of environmental problems in recent years, hybrid cars and electric vehicles have spread. Further, as an air conditioning device which is applicable to such a vehicle, there has been developed an air conditioning device which includes a compressor to compress and discharge a refrigerant, a radiator disposed on a vehicle interior side to let the refrigerant radiate heat, a heat absorber disposed on the vehicle interior side to let the refrigerant absorb heat, and an outdoor heat exchanger disposed outside the vehicle interior to let the refrigerant radiate heat or absorb heat, and in which there are changeable a heating mode to let the refrigerant discharged from the compressor radiate heat in the radiator and let the refrigerant from which the heat has been radiated in this radiator absorb heat in the outdoor heat exchanger, a dehumidifying and heating mode to let the refrigerant discharged from the compressor radiate heat in the radiator and let the refrigerant from which the heat has been radiated in the radiator absorb heat in the heat absorber and the outdoor heat exchanger, a dehumidifying and cooling mode to let the refrigerant discharged from the compressor radiate heat in the radiator and the outdoor heat exchanger and let the refrigerant absorb heat in the heat absorber, and a cooling mode to let the refrigerant discharged from the compressor radiate heat in the outdoor heat exchanger and let the refrigerant absorb heat in the heat absorber (e.g., see Patent Document 1)

In this case, an outdoor expansion valve is disposed in an inlet of the outdoor heat exchanger, and an indoor expansion valve is disposed in an inlet of the heat absorber. Further, a bypass circuit is provided in parallel in a series circuit of the outdoor expansion valve and the outdoor heat exchanger. Then, in the aforementioned dehumidifying and heating mode, the refrigerant passing through the radiator is distributed, and its part is caused to flow from the bypass circuit to the indoor expansion valve and decompressed therein, followed by being allowed to flow into the heat absorber to let the refrigerant absorb heat. Further, the residual refrigerant is caused to flow through the outdoor expansion valve and decompressed therein, and then caused to flow through the outdoor heat exchanger to let the refrigerant absorb heat.

Further, in such a dehumidifying and heating mode, the operation (number of revolutions) of the compressor has been controlled on the basis of a radiator pressure to thereby control a heating capability by the radiator, and the outdoor expansion valve has been controlled based on the temperature of the heat absorber to control a dehumidifying capability (cooling capability) by the heat absorber. That is, when the temperature of the heat absorber becomes lower than a target heat absorber temperature, a valve position of the outdoor expansion valve has been enlarged to reduce the amount of the refrigerant flowing from the bypass circuit to the heat absorber. When the temperature of the heat absorber becomes high in reverse, the valve position of the outdoor expansion valve has been reduced to increase the amount of the refrigerant flowing from the bypass circuit through the indoor expansion valve into the heat absorber.

CITATION LIST

Patent Documents

Patent Document 1: Japanese Patent Application Publication No. 2014-94673

SUMMARY OF THE INVENTION

Problems to be Solved by the Invention

As described above, the temperature of the heat absorber in the dehumidifying and heating mode has been controlled by the valve position of the outdoor expansion valve. Therefore, there is a risk that since the temperature of the heat absorber is lowered than the target heat absorber temperature under, for example, an environment in which the outdoor air temperature becomes low, even if the outdoor expansion valve is expanded to the maximum valve position, the blowing temperature of the air blown out to the vehicle interior is lowered. Thus, in Patent Document 1 described above, an evaporation pressure control valve (referred to as an evaporation capability control valve in Patent Document 1) is mounted to the refrigerant outlet side of the heat absorber, and the evaporation pressure control valve has been opened/closed in such a situation to reduce the amount of the refrigerant flowing into the heat absorber. The evaporation pressure control valve has, however, a drawback of being relatively expensive.

Thus, the operation of the compressor is controlled based on the temperature of the heat absorber even in the dehumidifying and heating mode without providing such an evaporation pressure control valve, and the temperature of the heat absorber may be adjusted to the target heat absorber temperature by the operation control of the compressor. In such a case, a problem arises in that since the number of revolutions of the compressor cannot be increased either at a low outdoor air temperature when the temperature of the heat absorber converges on the target heat absorber temperature, the temperature of the radiator is insufficient to make a comfortable dehumidifying and heating operation impossible when a high pressure of a refrigerant circuit is not raised to a target value even in a state in which the outdoor expansion valve is open to an upper limit of controlling, so that the dehumidifying and heating mode must be changed to another operation mode.

The present invention has been developed to solve such conventional technical problems, and an object thereof is to provide a vehicle air-conditioning apparatus capable of expanding an effective range of a dehumidifying and heating mode to achieve comfortable vehicle interior air conditioning.

Means for Solving the Problems

A vehicle air-conditioning apparatus of the present invention includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior to let the refrigerant absorb heat, an outdoor expansion valve to decompress the refrigerant flowing into the outdoor heat exchanger, a bypass circuit connected in parallel with a series circuit of the outdoor heat exchanger and the outdoor expansion valve, an indoor expansion valve to decompress the refrigerant flowing into the heat absorber, and a control device. The vehicle air-conditioning apparatus is characterized in that the control device executes at least a dehumidifying and heating mode to let the refrigerant discharged from the compressor radiate heat in the radiator, distribute the refrigerant from which the heat has been radiated, let a part of the refrigerant flow into the indoor expansion valve from the bypass circuit, decompress the refrigerant in the indoor expansion valve, and then let the refrigerant flow into the heat absorber to let the refrigerant absorb heat in the heat absorber, and decompress the residual refrigerant through the outdoor expansion valve, and then let the refrigerant flow into the outdoor heat exchanger to let the refrigerant absorb heat in the outdoor heat exchanger, and in the dehumidifying and heating mode, the control device controls the operation of the compressor on the basis of a heat absorber temperature Te being a temperature of the heat absorber or has a state of controlling the operation of the compressor on the basis of the heat absorber temperature Te, and when heat radiation in the radiator runs short, executes a radiator temperature priority mode to enlarge a capability of the compressor.

The vehicle air-conditioning apparatus of the invention of claim 2 is characterized in that in the above invention, the control device selects a smaller one of a target number of revolutions TGNCh of the compressor calculated based on a radiator pressure PCI being a pressure of the radiator, and a target number of revolutions TGNCc of the compressor calculated based on the heat absorber temperature Te to control the operation of the compressor in the dehumidifying and heating mode.

The vehicle air-conditioning apparatus of the invention of claim 3 is characterized in that in the above respective inventions, when in the dehumidifying and heating mode, the heat absorber temperature Te converges on a target heat absorber temperature TEO being a target value thereof, and heat radiation in the radiator runs short in a state in which a valve position of the outdoor expansion valve becomes a maximum valve position of controlling, the control device executes the radiator temperature priority mode.

The vehicle air-conditioning apparatus of the invention of claim 4 is characterized in that in the invention of claim 1, in the dehumidifying and heating mode, the control device executes a normal mode to control the operation of the compressor on the basis of the radiator pressure PCI being the pressure of the radiator and to control the valve position of the outdoor expansion valve on the basis of the heat absorber temperature Te, and shifts to the radiator temperature priority mode when in the normal mode, the heat absorber temperature Te converges on a target heat absorber temperature TEO being a target value thereof, and heat radiation in the radiator runs short in a state in which the valve position of the outdoor expansion valve becomes a maximum valve position of controlling, and in the radiator temperature priority mode, the control device selects a smaller one of a target number of revolutions TGNCh of the compressor calculated based on a radiator pressure PCI being a pressure of the radiator, and a target number of revolutions TGNCc of the compressor calculated based on the heat absorber temperature Te to control the operation of the compressor.

The vehicle air-conditioning apparatus of the invention of claim 5 is characterized in that in the above respective inventions, in the radiator temperature priority mode, the control device controls the operation of the compressor on the basis of the heat absorber temperature Te, and lowers the target heat absorber temperature TEO being the target value of the heat absorber temperature Te to enlarge the capability of the compressor.

The vehicle air-conditioning apparatus of the invention of claim 6 is characterized in that in the above invention, the control device lowers the target heat absorber temperature TEO according to a difference between the radiator pressure PCI being the pressure of the radiator and a target radiator pressure PCO being a target value of the radiator pressure PCI.

The vehicle air-conditioning apparatus of the invention of claim 7 is characterized in that in the above invention, the control device offsets a basic target heat absorber temperature TEO0 calculated from any of an outdoor air temperature, a temperature of the air in the vehicle interior, a humidity of the air in the vehicle interior, and a dewpoint temperature inside a window glass of a vehicle, or a combination of those, or all of them by a heat absorber temperature offset TEOPC calculated based on the difference between the radiator pressure PCI and the target radiator pressure PCO to thereby lower the target heat absorber temperature TEO.

The vehicle air-conditioning apparatus of the invention of claim 8 is characterized in that in the inventions of claims 5 to 7, the control device lowers the target heat absorber temperature TEO so as not to fall below a lower limit of controlling of the target heat absorber temperature TEO.

The vehicle air-conditioning apparatus of the invention of claim 9 is characterized in that in the inventions of claims 5 to 8, the vehicle air-conditioning apparatus includes an auxiliary heating device to heat the air to be supplied from the air flow passage to the vehicle interior, and in that when in the radiator temperature priority mode, heat radiation in the radiator runs short even if the target heat absorber temperature TEO is lowered to the lower limit of controlling, the control device let the auxiliary heating device generate heat.

The vehicle air-conditioning apparatus of the invention of claim 10 is characterized in that in the above respective inventions, the control device has a dehumidifying and cooling mode to let the refrigerant discharged from the compressor radiate heat in the radiator and the outdoor heat exchanger, decompress the refrigerant from which the heat has been radiated, by the indoor expansion valve, and then let the refrigerant flow into the heat absorber to thereby let the refrigerant absorb heat in the heat absorber, and the control device changes to the dehumidifying and cooling mode when in a state in which there is no need to execute the radiator temperature priority mode, the heat absorber temperature Te is higher than the target heat absorber temperature TEO being the target value of the heat absorber temperature Te even if the valve position of the outdoor expansion valve becomes a minimum valve position of controlling.

The vehicle air-conditioning apparatus of the invention of claim 11 is characterized in that in the above respective inventions, an evaporation pressure control valve is not provided on a refrigerant outlet side of the heat absorber.

Advantageous Effect of the Invention

According to the present invention, in a vehicle air-conditioning apparatus which includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior to let the refrigerant absorb heat, an outdoor expansion valve to decompress the refrigerant flowing into the outdoor heat exchanger, a bypass circuit connected in parallel with a series circuit of the outdoor heat exchanger and the outdoor expansion valve, an indoor expansion valve to decompress the refrigerant flowing into the heat absorber, and a control device, whereby the control device executes at least a dehumidifying and heating mode to let the refrigerant discharged from the compressor radiate heat in the radiator, distribute the refrigerant from which the heat has been radiated, let a part of the refrigerant flow into the indoor expansion valve from the bypass circuit, decompress the refrigerant in the indoor expansion valve, and then let the refrigerant flow into the heat absorber to let the refrigerant absorb heat in the heat absorber, and decompress the residual refrigerant through the outdoor expansion valve and then let the refrigerant flow into the outdoor heat exchanger to let the refrigerant absorb heat in the outdoor heat exchanger, in the dehumidifying and heating mode, the control device controls the operation of the compressor on the basis of a heat absorber temperature Te being a temperature of the heat absorber or has a state of controlling the operation of the compressor on the basis of the heat absorber temperature Te, and when heat radiation in the radiator runs short, executes a radiator temperature priority mode to increase a capability of the compressor. Therefore, for example, in the dehumidifying and heating mode as in the invention of claim 3 or 4, when the heat absorber temperature Te converges on a target heat absorber temperature TEO being a target value thereof and the heat radiation in the radiator runs short in a state in which a valve position of the outdoor expansion valve becomes a maximum valve position of controlling, the control device executes the radiator temperature priority mode, thereby making it possible to increase the capability of the compressor to raise a high pressure and thereby increase the amount of heat radiation of the refrigerant in the radiator.

Thus, for example, even when the outdoor air temperature is lowered so that the heat absorber temperature Te is reduced when the operation of the compressor is controlled based on the heat absorber temperature Te in the dehumidifying and heating mode, it is possible to ensure a heating capability by the radiator and maintain air conditioning performance. Comfortable vehicle interior air conditioning can be achieved by expanding an effective range of the dehumidifying and heating mode. This is effective specially in the case where no evaporation pressure control valve is provided on the refrigerant outlet side of the heat absorber as in the invention of claim 11.

Further, as in the invention of claim 2 or 4, if in the dehumidifying and heating mode or the radiator temperature priority mode thereof, the control device selects a smaller one of a target number of revolutions TGNCh of the compressor calculated based on a radiator pressure PCI being a pressure of the radiator, and a target number of revolutions TGNCc of the compressor calculated based on the heat absorber temperature Te to control the operation of the compressor, the control device is capable of selecting the target number of revolutions TGNCc when, for example, the outdoor air temperature is low, and controlling the heat absorber temperature Te to the target heat absorber temperature TEO being its target value by the operation control of the compressor. When the outdoor air temperature is high, the control device is capable of selecting the target number of revolutions TGNCh and eliminating the disadvantage that the high pressure is excessively raised.

In addition, as in the invention of claim 4, if in the dehumidifying and heating mode, the control device executes a normal mode to control the operation of the compressor on the basis of the radiator pressure PCI being the pressure of the radiator and to control the valve position of the outdoor expansion valve on the basis of the heat absorber temperature Te, and shifts to the radiator temperature priority mode when in the normal mode, the heat absorber temperature Te converges on the target heat absorber temperature TEO being the target value of the heat absorber temperature Te and heat radiation in the radiator runs short in a state in which the valve position of the outdoor expansion valve becomes a maximum valve position of controlling, the control device is capable of appropriately grasping a situation in which the lowering of the heat absorber temperature Te cannot be prevented due to the valve position of the outdoor expansion valve 6, and the heat radiation in the radiator runs short, and thereby to shift to the radiator temperature priority mode, enhancing the capability of the compressor to raise the high pressure, and thereby increasing the amount of heat radiation of the refrigerant in the radiator.

In the inventions described above, as in the invention of claim 5, if in the radiator temperature priority mode, the control device controls the operation of the compressor on the basis of the heat absorber temperature Te, and lowers the target heat absorber temperature TEO being the target value of the heat absorber temperature Te, it is possible to enlarge the capability of the compressor to increase the amount of heat radiation in the radiator while appropriately controlling the heat absorber temperature Te by increasing the capability of the compressor.

In this case, as in the invention of claim 6, if the control device lowers the target heat absorber temperature TEO according to a difference between the radiator pressure PCI being the pressure of the radiator and a target radiator pressure PCO being a target value of the radiator pressure PCI, it is possible to grasp according to the difference between the radiator pressure PCI and the target radiator pressure PCO that the heat radiation in the radiator is insufficient, and to contribute even to energy saving by appropriately lowering the target heat absorber temperature TEO and increasing the amount of heat radiation in the radiator with high accuracy.

In particular, as in the invention of claim 7, the control device offsets a basic target heat absorber temperature TEO0 calculated from any of an outdoor air temperature, a temperature of the air in the vehicle interior, a humidity of the air in the vehicle interior, and a dewpoint temperature inside a window glass of a vehicle, or a combination of those, or all of them by a heat absorber temperature offset TEOPC calculated based on the difference between the radiator pressure PCI and the target radiator pressure PCO to thereby lower the target heat absorber temperature TEO, whereby the target heat absorber temperature TEO can be appropriately lowered on the basis of the basic target heat absorber temperature TEO0. Further, as in the invention of claim 8, the control device lowers the target heat absorber temperature TEO so as not to fall below a lower limit of controlling of the target heat absorber temperature TEO, thereby making it possible to avoid even the disadvantage that the target heat absorber temperature TEO is excessively lowered to cause frost attaching to the heat absorber.

On the other hand, as in the invention of claim 9, if, when there is provided an auxiliary heating device to heat the air to be supplied from the air flow passage to the vehicle interior, the control device allows the auxiliary heating device to generate heat in the radiator temperature priority mode where heat radiation in the radiator runs short even if the target heat absorber temperature TEO is lowered to the lower limit of controlling, it is possible to heat the air to be supplied to the vehicle interior by the auxiliary heating device when the shortage of heat radiation in the radiator cannot be eliminated by an increase in the capability of the compressor, and thereby maintain comfortable dehumidifying and heating.

Further, as in the invention of claim 10, if, when the control device has a dehumidifying and cooling mode to let the refrigerant discharged from the compressor radiate heat in the radiator and the outdoor heat exchanger, decompress the refrigerant from which the heat has been radiated, by the indoor expansion valve, and then let the refrigerant flow into the heat absorber to thereby let the refrigerant absorb heat in the heat absorber, the control device changes to the dehumidifying and cooling mode when in a state in which there is no need to execute the radiator temperature priority mode, the heat absorber temperature Te is higher than the target heat absorber temperature TEO being the target value of the heat absorber temperature Te even if the valve position of the outdoor expansion valve becomes a minimum valve position of controlling, the control device is capable of shifting to the dehumidifying and cooling mode when the target heat absorber temperature TEO cannot be achieved by the valve position of the outdoor expansion valve with a rise in the outdoor air temperature or the like, to thereby smoothly continue comfortable vehicle interior air conditioning.

MODE FOR CARRYING OUT THE INVENTION

Hereinafter, description will be made as to embodiments of the present invention in detail with reference to the drawings.

Figure 1:
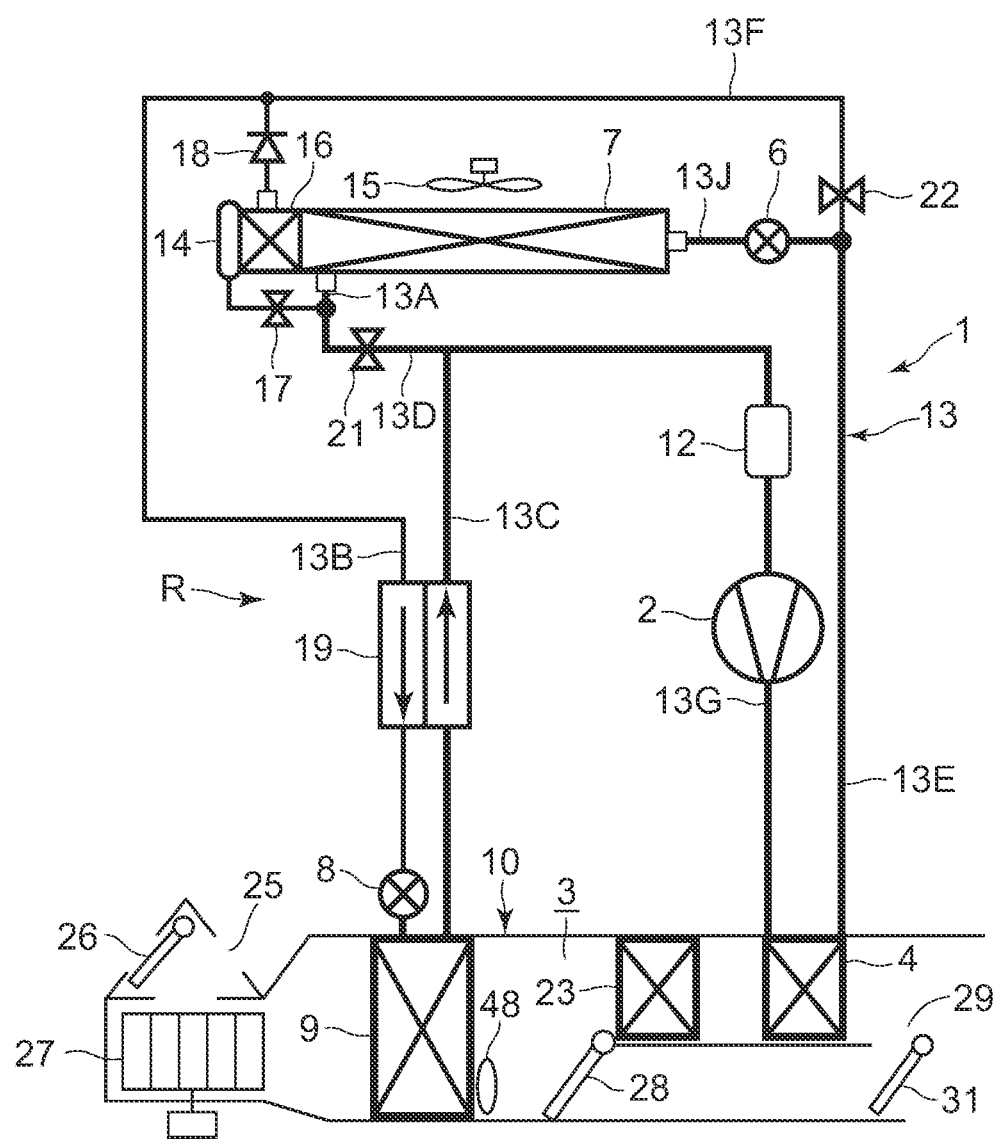
FIG. 1 is a constitutional view of a vehicle air-conditioning apparatus of an embodiment to which the present invention is applied.

FIG. 1 shows a constitutional view of a vehicle air-conditioning apparatus 1 of an embodiment of the present invention. A vehicle of the embodiment to which the present invention is applied is an electric vehicle (EV) in which an engine (an internal combustion engine) is not mounted, and runs with an electric motor for running which is driven by power charged in a battery (both being not shown in the drawing), and the vehicle air-conditioning apparatus 1 of the present invention is also driven by the power of the battery. That is, in the electric vehicle which is not capable of performing heating by engine waste heat, the vehicle air-conditioning apparatus 1 of the embodiment performs a heating mode by a heat pump operation in which a refrigerant circuit is used. Further, the vehicle air-conditioning apparatus 1 selectively executes respective operation modes of a dehumidifying and heating mode, an internal cycle mode, a dehumidifying and cooling mode, a cooling mode, and an auxiliary heater single mode.

Incidentally, the vehicle is not limited to the electric vehicle, and the present invention is also effective for a so-called hybrid car in which the engine is used together with the electric motor for running. Further, it is needless to say that the present invention is also applicable to a usual car which runs with the engine.

The vehicle air-conditioning apparatus 1 of the embodiment performs air conditioning (heating, cooling, dehumidifying, and ventilation) of a vehicle interior of the electric vehicle. An electric type of compressor 2 to compress a refrigerant, a radiator 4 provided in an air flow passage 3 of an HVAC unit 10 in which vehicle interior air is ventilated and circulated, to let the high-temperature high-pressure refrigerant discharged from the compressor 2 flow therein via a refrigerant pipe 13G and to let the refrigerant radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 (which may be a mechanical expansion valve) constituted of an electric valve to decompress and expand the refrigerant, a heat absorber 9 provided in the air flow passage 3 to let the refrigerant absorb heat during the cooling and dehumidifying from interior and exterior of the vehicle, an accumulator 12, and others are successively connected by a refrigerant pipe 13, whereby a refrigerant circuit R is constituted.

Incidentally, an outdoor blower 15 is provided in the outdoor heat exchanger 7. The outdoor blower 15 forcibly passes the outdoor air through the outdoor heat exchanger 7 to thereby perform the heat exchange between the outdoor air and the refrigerant, whereby the outdoor air is made to pass through the outdoor heat exchanger 7 even during stopping of the vehicle (i.e., its velocity is 0 km/h).

Further, the outdoor heat exchanger 7 has a receiver drier portion 14 and a subcooling portion 16 successively on a refrigerant downstream side. A refrigerant pipe 13A connected to a refrigerant outlet of the outdoor heat exchanger 7 is connected to the receiver drier portion 14 via a solenoid valve 17 (an opening/closing valve) to be opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

Furthermore, a refrigerant pipe 13B between the check valve 18 and the indoor expansion valve 8 is disposed in a heat exchange relation with a refrigerant pipe 13C positioned on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9.

Additionally, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve 21 (an opening/closing valve) to be opened during the heating. The refrigerant pipe 13C is connected to the accumulator 12, and the accumulator 12 is connected to a refrigerant suction side of the compressor 2.

In addition, a refrigerant pipe 13E on an outlet side of the radiator 4 branches into a refrigerant pipe 13J and a refrigerant pipe 13F before the outdoor expansion valve 6, and this one branching refrigerant pipe 13J is connected to a refrigerant inlet of the outdoor heat exchanger 7 via the outdoor expansion valve 6. Also, the other branching refrigerant pipe 13F communicates and connects with the refrigerant pipe 13B on a downstream side of the check valve 18 via a solenoid valve 22 (an opening/closing valve) to be opened during the dehumidifying. Thus, the refrigerant pipe 13F is connected in parallel with a series circuit of the outdoor expansion valve 6 and the outdoor heat exchanger 7 to form a bypass circuit in the present invention. The solenoid valve 22 is connected to the middle of the bypass circuit (the refrigerant pipe 13F).

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air of the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor or outdoor air to the air flow passage 3.

Furthermore, in FIG. 1, 23 denotes an auxiliary heater as an auxiliary heating device disposed in the vehicle air-conditioning apparatus 1 of the embodiment. The auxiliary heater 23 is constituted of a PTC heater (an electric heater) in the embodiment, and disposed in the air flow passage 3 which functions as an air upstream side of the radiator 4 to the flow of the air in the air flow passage 3. Then, when the auxiliary heater 23 is energized to generate heat, the auxiliary heater becomes a so-called heater core to perform heating of the vehicle interior.

Additionally, in the air flow passage 3 on an air upstream side of the auxiliary heater 23, an air mix damper 28 is disposed to adjust a ratio at which the air in the air flow passage 3 (the indoor or outdoor air) flowing into the air flow passage 3 and passed through the heat absorber 9 is to be passed through the auxiliary heater 23 and the radiator 4. Furthermore, in the air flow passage 3 on an air downstream side of the radiator 4, there is formed each outlet (represented by an outlet 29 in FIG. 1) of FOOT (foot), VENT (vent) or DEF (def), and in the outlet 29, an outlet changing damper 31 is disposed to execute changing control of blowing of the air from each outlet mentioned above.

Figure 2:
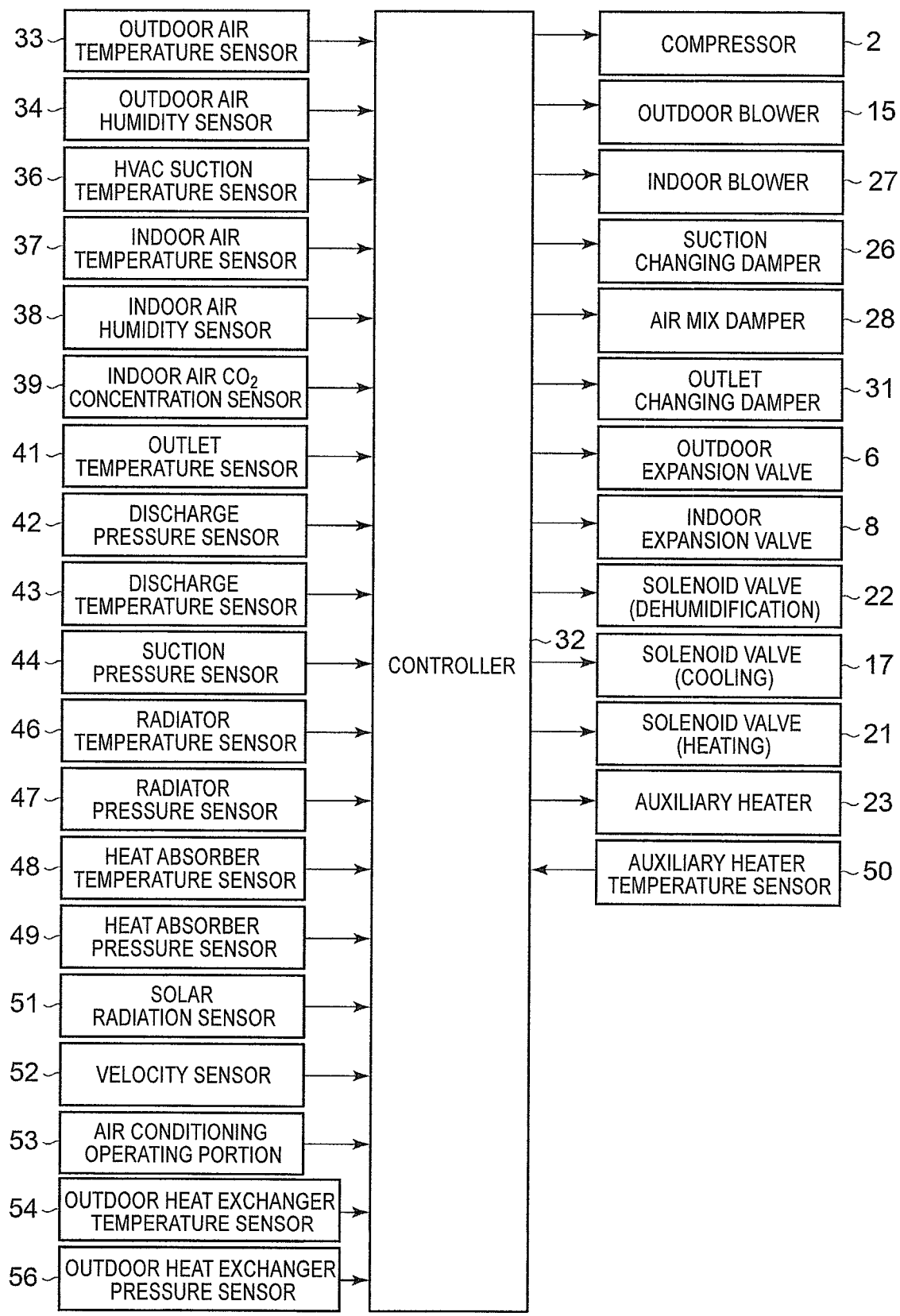
FIG. 2 is a block diagram of an electric circuit of a controller of the vehicle air-conditioning apparatus of FIG. 1.

Next, in FIG. 2, 32 denotes a controller (ECU) that is a control device. The controller 32 is constituted of a microcomputer that is an example of a computer including a processor, and an input of the controller is connected to respective outputs of an outdoor air temperature sensor 33 which detects an outdoor air temperature (Tam) of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects an indoor air temperature that is a temperature of the air (indoor air) of the vehicle interior, an indoor air humidity sensor 38 which detects an indoor air humidity that is a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the outlet 29 to the vehicle interior, a discharge pressure sensor 42 which detects a pressure (a discharge pressure Pd) of the refrigerant discharged from the compressor 2, a discharge temperature sensor 43 which detects a temperature of the refrigerant discharged from the compressor 2, a suction pressure sensor 44 which detects a pressure of the refrigerant to be sucked into the compressor 2, a radiator temperature sensor 46 which detects a temperature of the radiator 4 (the temperature of the radiator 4 itself or the temperature of the refrigerant immediately after the refrigerant flows out from the radiator 4: a radiator temperature TCI), a radiator pressure sensor 47 which detects a refrigerant pressure of the radiator 4 (the pressure of the refrigerant in the radiator 4 or immediately after the refrigerant flows out from the radiator 4: a radiator pressure PCI), a heat absorber temperature sensor 48 which detects a temperature of the heat absorber 9 (the temperature of the air passed through the heat absorber 9 or the temperature of the heat absorber 9 itself: a heat absorber temperature Te), a heat absorber pressure sensor 49 which detects a refrigerant pressure of the heat absorber 9 (the pressure of the refrigerant in the heat absorber 9 or immediately after the refrigerant flows out from the heat absorber 9), a solar radiation sensor 51 of, e.g., a photo sensor system to detect a solar radiation amount into the vehicle, a velocity sensor 52 to detect a moving speed (a velocity) of the vehicle, an air conditioning (aircon) operating portion 53 to set the changing of a predetermined temperature or the operation mode, an outdoor heat exchanger temperature sensor 54 which detects a temperature of the outdoor heat exchanger 7 (the temperature of the refrigerant immediately after the refrigerant flows out from the outdoor heat exchanger 7, or the temperature of the outdoor heat exchanger 7 itself), and an outdoor heat exchanger pressure sensor 56 which detects a refrigerant pressure of the outdoor heat exchanger 7 (the pressure of the refrigerant in the outdoor heat exchanger 7 or immediately after the refrigerant flows out from the outdoor heat exchanger 7).

Besides, the input of the controller 32 is further connected to an output of an auxiliary heater temperature sensor 50 which detects a temperature of the auxiliary heater 23 (the temperature of the air passed through the auxiliary heater 23 or the temperature of the auxiliary heater 23 itself: an auxiliary heater temperature Tptc) as well.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves of the solenoid valve 22 (for the dehumidifying), the solenoid valve 17 (for the cooling), and the solenoid valve 21 (for the heating), and the auxiliary heater 23. Then, the controller 32 controls these components on the basis of the outputs of the respective sensors and the setting input by the air conditioning operating portion 53.

Next, description will be made as to an operation of the vehicle air-conditioning apparatus 1 of the embodiment having the above constitution. The controller 32 changes and executes respective operation modes of a heating mode, a dehumidifying and heating mode, an internal cycle mode, a dehumidifying and cooling mode, a cooling mode, and an auxiliary heater single mode. Initially, description will be made as to an outline of each operation mode.

(1) Heating Mode

When the heating mode is selected by the controller 32 (an automatic mode) or a manual operation to the air conditioning operating portion 53 (a manual mode), the controller 32 opens the solenoid valve 21 (for the heating) and closes the solenoid valve 17. Also, the controller 32 closes the solenoid valve 22.

Then, the controller operates the compressor 2 and the respective blowers 15 and 27, and the air mix damper 28 has a state of adjusting a ratio at which the air in the air flow passage 3 after being blown out from the indoor blower 27 and passed through the heat absorber 9 is to be passed through auxiliary heater 23 and the radiator 4. In consequence, a high-temperature high-pressure gas refrigerant discharged from the compressor 2 flows into the radiator 4. The air in the air flow passage 3 passes through the radiator 4, and hence the air in the air flow passage 3 is heated by the high-temperature refrigerant (the auxiliary heater 23 and the radiator 4 when the auxiliary heater 23 is operated) in the radiator 4. On the other hand, the refrigerant in the radiator 4 has the heat taken by the air and is cooled to condense and liquefy.

The refrigerant liquefied in the radiator 4 flows out from the radiator 4 and then flows through the refrigerant pipes 13E and 13J to reach the outdoor expansion valve 6. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15 (a heat absorbing operation). In other words, the refrigerant circuit R functions as a heat pump. Then, the low-temperature refrigerant flowing out from the outdoor heat exchanger 7 flows through the refrigerant pipe 13A, the solenoid valve 21, and the refrigerant pipe 13D, and flows from the refrigerant pipe 13C into the accumulator 12 to perform gas-liquid separation, and the gas refrigerant is sucked into the compressor 2, thereby repeating this circulation. The air flowing into the radiator 4 through the auxiliary heater 23 and heated in the radiator 4 is blown out from the outlet 29, thereby performing the heating of the vehicle interior.

The controller 32 calculates a target radiator pressure PCO (a target value of the pressure PCI of the radiator 4) from a target heater temperature TCO (a target value of the radiator temperature TCI) calculated from an after-mentioned target outlet temperature TAO, and controls the number of revolutions of the compressor 2 on the basis of the target radiator pressure PCO and the refrigerant pressure (the radiator pressure PCI that is a high pressure of the refrigerant circuit R) of the radiator 4 which is detected by the radiator pressure sensor 47. Further, the controller 32 controls a valve position of the outdoor expansion valve 6 on the basis of the temperature (the radiator temperature TCI) of the radiator 4 which is detected by the radiator temperature sensor 46 and the radiator pressure PCI detected by the radiator pressure sensor 47, and controls a subcool degree (SC) of the refrigerant in an outlet of the radiator 4. The target heater temperature TCO is basically TCO=TAO, but a predetermined limit of controlling is provided.

Further, when the controller 32 judges that the heating capability by the radiator 4 runs short in the heating mode, the controller 32 energizes the auxiliary heater 23 to generate heat, thereby executing the heating by the auxiliary heater 23. Consequently, when the heating capability generable by the radiator 4 runs short to the required heating capability (calculated from a difference between the target heater temperature TCO obtainable from the target outlet temperature TAO and the heat absorber temperature Te), the auxiliary heater 23 complements this shortage of the heating capability.

(2) Dehumidifying and Heating Mode

Next, in the dehumidifying and heating mode, the controller 32 opens the solenoid valve 22 in the above state of the heating mode. In consequence, a part of the condensed refrigerant flowing through the radiator 4 into the refrigerant pipe 13E is distributed. This part of the refrigerant flows through the solenoid valve 22 into the refrigerant pipe 13F and flows from the refrigerant pipe 13B through the internal heat exchanger 19 into the indoor expansion valve 8, and the residual refrigerant flows through the outdoor expansion valve 6. That is, the distributed part of the refrigerant is decompressed by the indoor expansion valve 8, and then flows into the heat absorber 9 to evaporate.

The controller 32 controls the valve position of the indoor expansion valve 8 to maintain a superheat degree (SH) of the refrigerant in an outlet of the heat absorber 9 at a predetermined value, but water in the air blown out from the indoor blower 27 coagulates to adhere to the heat absorber 9 by a heat absorbing operation of the refrigerant which occurs in the heat absorber 9 at this time. Hence, the air is cooled and dehumidified. The distributed residual refrigerant flowing into the refrigerant pipe 13J is decompressed by the outdoor expansion valve 6, and then evaporates in the outdoor heat exchanger 7 and absorbs heat from the outdoor air.

The refrigerant evaporated in the heat absorber 9 flows through the internal heat exchanger 19 to join the refrigerant (refrigerant from the outdoor heat exchanger 7) from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4 (the auxiliary heater 23 and radiator 4 when the auxiliary heater 23 generates heat, as will be descried later), thereby performing the dehumidifying and heating of the vehicle interior.

The controller 32 changes and executes a normal mode, a radiator temperature priority mode, and a radiator temperature priority+auxiliary heating mode in the dehumidifying and heating mode, but these will be described in detail later. Further, in the embodiment, the controller 32 controls the number of revolutions of the compressor 2 on the basis of the target radiator pressure PCO calculated from the target heater temperature TCO and the radiator pressure PCI (the high pressure of the refrigerant circuit R) detected by the radiator pressure sensor 47 or controls the number of revolutions of the compressor 2 on the basis of the temperature (the heat absorber temperature Te) of the heat absorber 9 which is detected by the heat absorber temperature sensor 48, and the target heat absorber temperature TEO being its target value. At this time, the controller 32 selects a lower compressor target number of revolutions obtainable from either of calculations from the radiator pressure PCI and the heat absorber temperature Te to control the compressor 2. Also, the controller 32 controls a valve position of the outdoor expansion valve 6 on the basis of the heat absorber temperature Te. Further, the controller 32 also controls the generation of heat by the auxiliary heater 23, but description will be made in detail later as to control of the compressor 2, the outdoor expansion valve 6 and the auxiliary heater 23 in this dehumidifying and heating mode.

(3) Internal Cycle Mode

Next, in the internal cycle mode, the controller 32 fully closes the outdoor expansion valve 6 in the above state of the dehumidifying and heating mode (a full close position) and closes the solenoid valve 21. In other words, this internal cycle mode is a state where the outdoor expansion valve 6 is fully closed by the control of the outdoor expansion valve 6 in the dehumidifying and heating mode, and hence the internal cycle mode can also be regarded as a part of the dehumidifying and heating mode.

However, the outdoor expansion valve 6 and the solenoid valve 21 are closed, thereby obstructing inflow of the refrigerant into the outdoor heat exchanger 7 and outflow of the refrigerant from the outdoor heat exchanger 7, and hence all the condensed refrigerant flowing through the radiator 4 into the refrigerant pipe 13E flows through the solenoid valve 22 to the refrigerant pipe 13F. Then, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the internal heat exchanger 19 into the refrigerant pipe 13C and flows through the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence the heat is not pumped up from the outdoor air, but the heating capability for a consumed power of the compressor 2 is exerted. The whole amount of the refrigerant flows through the heat absorber 9 which exerts a dehumidifying operation, and hence as compared with the above dehumidifying and heating mode, a dehumidifying capability is higher, but the heating capability lowers.

The controller 32 controls the number of revolutions of the compressor 2 on the basis of the radiator pressure PCI (high pressure of the refrigerant circuit R) or the heat absorber temperature Te. Even in this case, the controller 32 selects a smaller compressor target number of revolutions obtainable from either of calculations from the radiator pressure PCI and the heat absorber temperature Te to control the compressor 2.

(4) Dehumidifying and Cooling Mode

Next, in the dehumidifying and cooling mode, the controller 32 opens the solenoid valve 17 and closes the solenoid valve 21. Also the controller closes the solenoid valve 22. Then, the controller operates the compressor 2 and the respective blowers 15 and 27, and the air mix damper 28 has a state of adjusting a ratio at which the air in the air flow passage 3 blown out from the indoor blower 27 and flowing through the heat absorber 9 is to be passed through the auxiliary heater 23 and the radiator 4. In consequence, the high-temperature high-pressure gas refrigerant discharged from the compressor 2 flows into the radiator 4. Through the radiator 4, the air in the air flow passage 3 passes, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the internal heat exchanger 19 to reach the accumulator 12 through the refrigerant pipe 13C, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior.

The controller 32 controls the number of revolutions of the compressor 2 on the basis of the temperature (the heat absorber temperature Te) of the heat absorber 9 which is detected by the heat absorber temperature sensor 48. Further, the controller 32 executes simple control to compare the radiator pressure PCI (the high pressure of the refrigerant circuit R) and the target radiator pressure PCO and to change the valve position of the outdoor expansion valve 6 from a magnitude relation between the pressures in an enlarging direction or a reducing direction as much as a constant value, thereby controlling the refrigerant pressure (the radiator pressure PCI) of the radiator 4.

(5) Cooling Mode

Next, in the cooling mode, the controller 32 fully opens the valve position of the outdoor expansion valve 6 in the above state of the dehumidifying and cooling mode. Further, the air mix damper 28 has a state of adjusting a ratio at which the air in the air flow passage 3 after being blown out from the indoor blower 27 and passed through the heat absorber 9 is to be passed through the auxiliary heater 23 and the radiator 4.

In consequence, the high-temperature high-pressure gas refrigerant discharged from the compressor 2 flows into the radiator 4. The refrigerant flowing out from the radiator 4 flows through the refrigerant pipe 13E to reach the outdoor expansion valve 6. At this time, the outdoor expansion valve 6 is fully open, and hence the refrigerant passes the refrigerant pipe 13J through the outdoor expansion valve 6 and flows into the outdoor heat exchanger 7 as it is, in which the refrigerant is cooled by the running therein or the outdoor air passing through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled.

The refrigerant evaporated in the heat absorber 9 flows through the internal heat exchanger 19 and the refrigerant pipe 13C to reach the accumulator 12, and flows therethrough to be sucked into the compressor 2, thereby repeating this circulation. The air cooled and dehumidified in the heat absorber 9 is blown out from the outlet 29 to the vehicle interior, thereby performing the cooling of the vehicle interior. In this cooling mode, the controller 32 controls the number of revolutions of the compressor 2 on the basis of the temperature (the heat absorber temperature Te) of the heat absorber 9 which is detected by the heat absorber temperature sensor 48.

(6) Auxiliary Heater Single Mode

Incidentally, the controller 32 of the embodiment has an auxiliary heater single mode of in the cases such as when excessive frosting occurs in the outdoor heat exchanger 7, etc., stopping the compressor 2 and the outdoor blower 15 in the refrigerant circuit R, and energizing the auxiliary heater 23 to heat the vehicle interior only by the auxiliary heater 23. Even in this case, the controller 32 controls energization (heat generation) of the auxiliary heater 23 on the basis of the auxiliary heater temperature Tptc detected by the auxiliary heater temperature sensor 50 and the above-described target heater temperature TCO.

Further, the controller 32 operates the indoor blower 27, and the air mix damper 28 has a state of passing the air in the air flow passage 3, which is blown out from the indoor blower 27, through the auxiliary heater 23 to adjust an air volume. The air heated by the auxiliary heater 23 is blown out from the outlet 29 to the vehicle interior, and hence the heating of the vehicle interior is performed.

(7) Changing of Operation Mode

The controller 32 calculates the aforementioned target outlet temperature TAO from the following formula (I). The target outlet temperature TAO is a target value of the temperature of the air blown out to the vehicle interior.

$$TAO=(Tset-Tin)\times K+Tbal(f(Tset, SUN, Tam)) \qquad (I)$$

where Tset is a predetermined temperature of the vehicle interior which is set by the air conditioning operating portion 53, Tin is a temperature (indoor air temperature) of the air in the vehicle interior which is detected by the indoor air temperature sensor 37, K is a coefficient, and Tbal is a balance value calculated from the predetermined temperature Tset, the solar radiation amount SUN detected by the solar radiation sensor 51, and the outdoor air temperature Tam detected by the outdoor air temperature sensor 33. Further, in general, the lower the outdoor air temperature Tam is, the higher the target outlet temperature TAO becomes, and the target outlet temperature TAO is lowered with rising of the outdoor air temperature Tam.

The controller 32 selects any operation mode from the above respective operation modes on the basis of the outdoor air temperature Tam (detected by the outdoor air temperature sensor 33) and the target outlet temperature TAO on startup. Further, after the startup, the controller 32 changes the respective operation modes on the basis of parameters such as the outdoor air temperature Tam, the humidity of the vehicle interior, the target outlet temperature TAO, a heating temperature TH (a temperature of the air on the leeward side of the radiator 4, which is an estimated value) to be described later, the target heater temperature TCO, the heat absorber temperature Te, the target heat absorber temperature TEO, the presence or absence of a dehumidifying request for the vehicle interior, etc. and thereby appropriately changes the heating mode, the dehumidifying and heating mode, the internal cycle mode, the dehumidifying and cooling mode, the cooling mode, and the auxiliary heater single mode according to environment conditions or the dehumidifying request to control the temperature of the air blown out to the vehicle interior to the target outlet temperature TAO. Changing from the dehumidifying and heating mode of achieving comfortable and efficient vehicle interior air conditioning to the dehumidifying and cooling mode will be described in detail later.

(8) Control of Compressor 2 by Controller 32 in Dehumidifying and Heating Mode

In the dehumidifying and heating mode of the embodiment as described above, the controller 32 selects the lower compressor target number of revolutions obtainable from either of calculations from the radiator pressure PCI and the heat absorber temperature Te to control the compressor 2, but the following changing control of the compressor target number of revolutions will be descried in detail.

Figure 3:
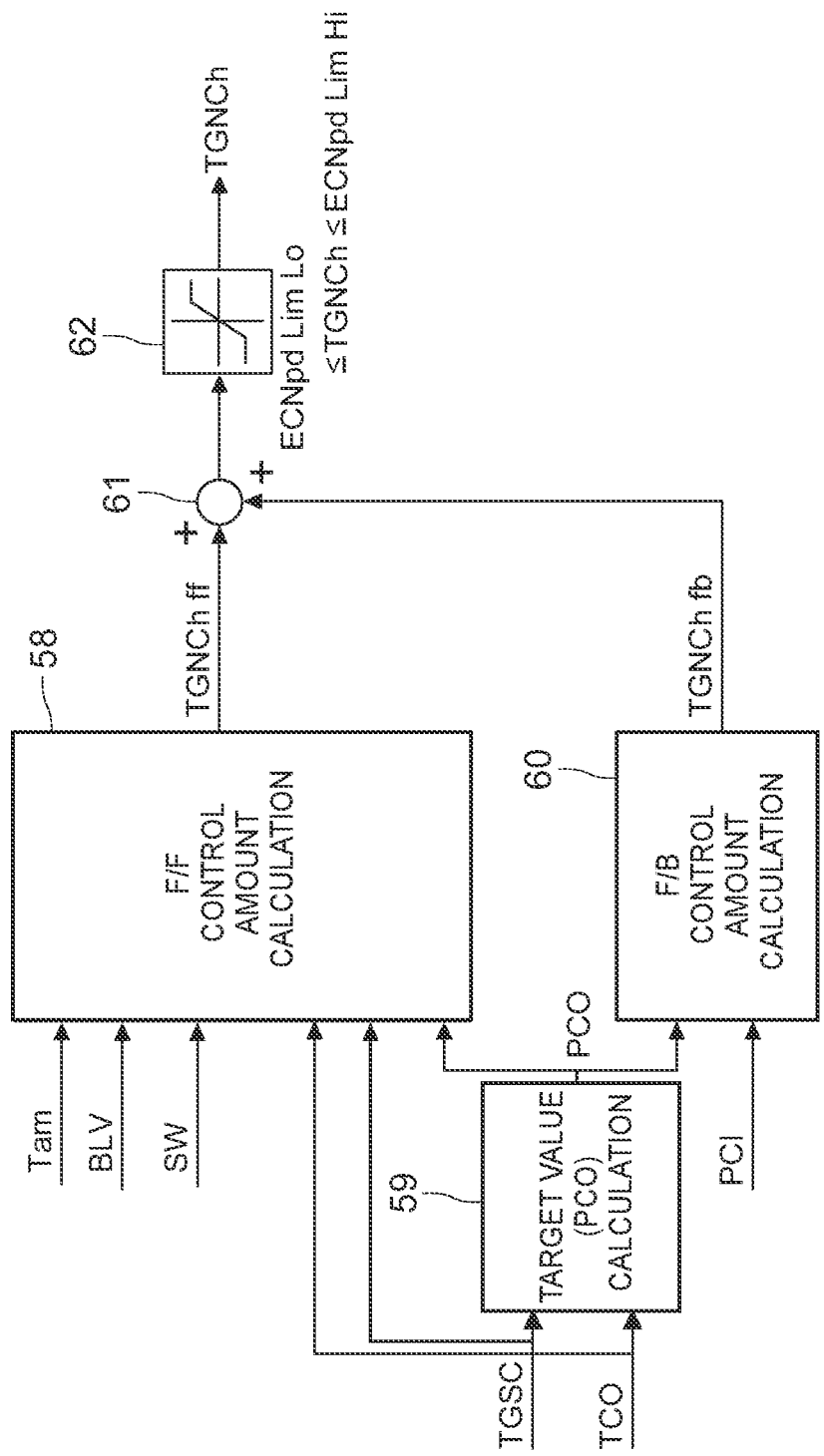
FIG. 3 is a control block diagram concerning compressor control of the controller of FIG. 2.

(8-1) Calculation of Compressor Target Number of Revolutions TGNCh Based on Radiator Pressure PCI First, description will be made in detail as to control of the compressor 2 on the basis of the radiator pressure PCI using FIG. 3. FIG. 3 is a control block diagram of the controller 32 which calculates a target number of revolutions (compressor target number of revolutions) TGNCh of the compressor 2 on the basis of the radiator pressure PCI (the same also applies to the heating mode). An F/F (feedforward) control amount calculation section 58 of the controller 32 calculates an F/F control amount TGNChff of the compressor target number of revolutions on the basis of the outdoor air temperature Tam obtainable from the outdoor air temperature sensor 33, a blower voltage BLV of the indoor blower 27, an air volume ratio SW by the air mix damper 28, which is obtained by SW=(TAO−Te)/(TH−Te), a target subcool degree TGSC that is a target value of a subcool degree SC in the outlet of the radiator 4, and the above-mentioned target heater temperature TCO that is the target value of the temperature of the radiator 4, and the target radiator pressure PCO that is the target value of the pressure of the radiator 4.

Here, the above TH used to calculate the air volume ratio SW is a temperature (hereinafter called a heating temperature) of the air on the leeward side of the radiator 4. The controller 32 estimates the TH from a first-order lag calculation formula (II) shown below:

$$TH=(INTL \times THO+\text{Tau} \times THz)/(\text{Tau}+INTL) \tag{II}$$

where INTL is a calculation period (constant), Tau is a time constant of a first-order lag, THO is a steady-state value of the heating temperature TH in a steady state before a first-order lag calculation, and THz is a previous value of the heating temperature TH. Estimating the heating temperature TH in this manner makes it unnecessary to provide a special temperature sensor. Incidentally, the controller 32 changes the above time constant Tau and steady-state value THO according to the aforementioned operation modes to thereby make the above-described estimation formula (II) different depending on the operation mode to estimate the heating temperature TH.

The target radiator pressure PCO is calculated by a target value calculation section 59 on the basis of the above target subcool degree TGSC and target heater temperature TCO. Further, an F/B (feedback) control amount calculation section 60 calculates an F/B control amount TGNChfb of a compressor target number of revolutions on the basis of the target radiator pressure PCO and the radiator pressure PCI being the refrigerant pressure of the radiator 4. Then, the F/F control amount TGNCnff calculated by the F/F control amount calculation section 58 and TGNChfb calculated by the F/B control amount calculation section 60 are added in an adder 61, and its result is added with limits of an upper limit of controlling and a lower limit of controlling in a limit setting section 62, followed by being determined as the compressor target number of revolutions TGNCh. This compressor target number of revolutions TGNCh is the target number of revolutions of the compressor 2 calculated on the basis of the radiator pressure PCI.

Figure 4:
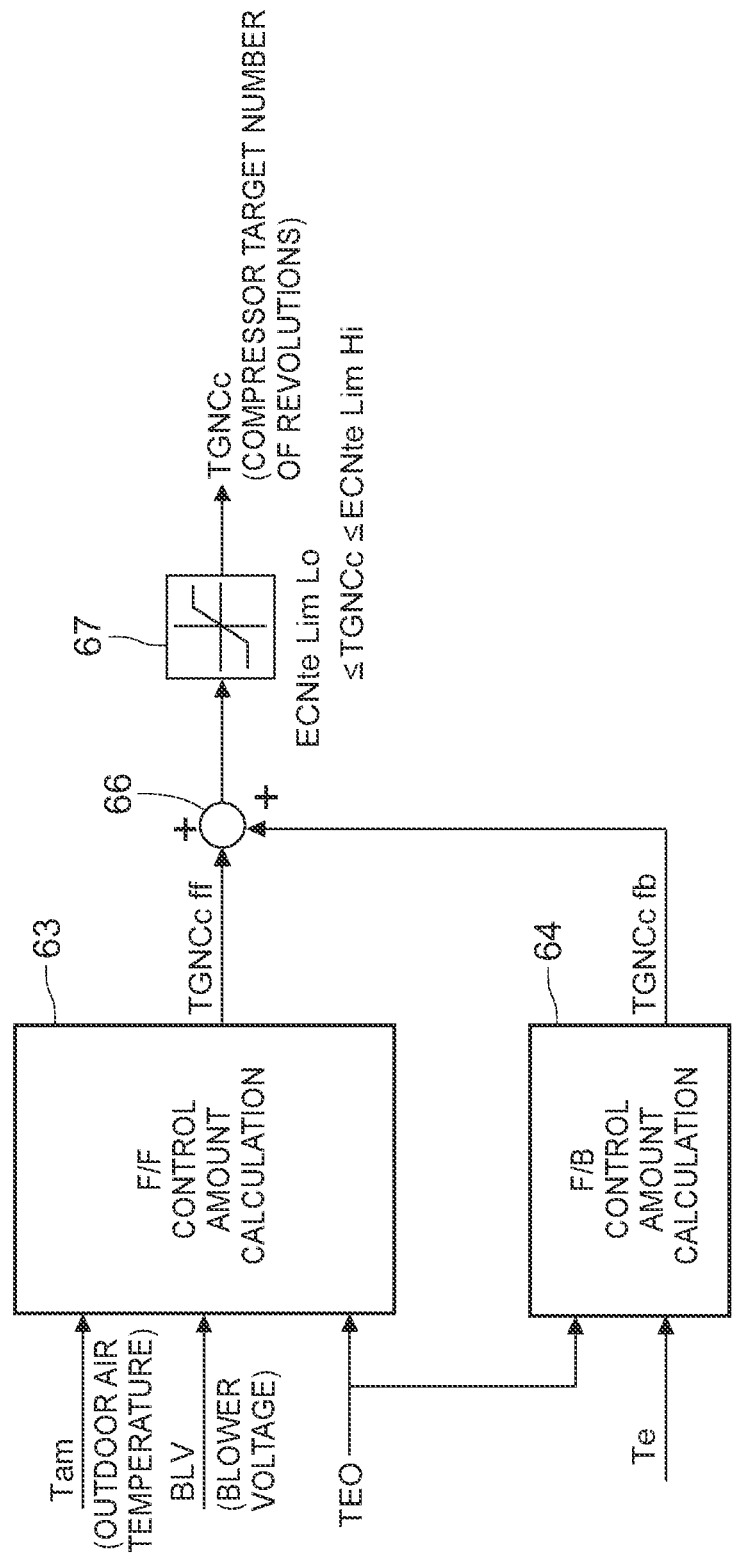
FIG. 4 is another control block diagram concerning compressor control of the controller of FIG. 2.

(8-2) Calculation of Compressor Target Number of Revolutions TGNCc Based on Heat Absorber Temperature Te Next, description will be made in detail as to control of the compressor 2 based on the heat absorber temperature Te using FIG. 4. FIG. 4 is a control block diagram of the controller 32 which calculates a target number of revolutions (a compressor target number of revolutions) TGNCc of the compressor 2 on the basis of the heat absorber temperature Te (the same also applies to the dehumidifying and cooling mode and the cooling mode). An F/F control amount calculation section 63 of the controller 32 calculates an F/F control amount TGNCcff of the compressor target number of revolutions on the basis of the outdoor air temperature Tam, the blower voltage BLV of the indoor blower 27, and the heat absorber temperature Te (the target heat absorber temperature TEO being a target value of the temperature of the heat absorber 9).

Further, an F/B control amount calculation section 64 calculates an F/B control amount TGNCcfb of the compressor target number of revolutions on the basis of the target heat absorber temperature TEO and the heat absorber temperature Te. Then, the F/F control amount TGNCcff calculated by the F/F control amount calculation section 63 and the F/B control amount TGNCcfb calculated by the F/B control amount calculation section 64 are added in an adder 66, and its result is added with limits of an upper limit of controlling and a lower limit of controlling in a limit setting section 67 and then determined as the compressor target number of revolutions TGNCc. This compressor target number of revolutions TGNCc is the target number of revolutions of the compressor 2 calculated based on the heat absorber temperature Te.

(8-3) Determination of Compressor Target Number of Revolutions TGNC

Figure 5:
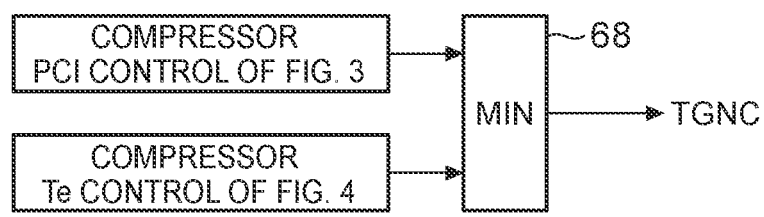
FIG. 5 is a control block diagram concerning determination of a compressor target number of revolutions in a dehumidifying and heating mode by the controller of FIG. 2.

Then, in the dehumidifying and heating mode of the embodiment, as shown in FIG. 5, the controller 32 compares the compressor target number of revolutions TGNCh calculated based on the radiator pressure PCI in the control block diagram of FIG. 3, and the compressor target number of revolutions TGNCc calculated based on the heat absorber temperature Te in the control block diagram of FIG. 4 by a comparison section 68 to select the smaller one of these, and determines the same to be the compressor target number of revolutions TGNC, thereby controlling the number of revolutions NC of the compressor 2 on the basis of the selected compressor target number of revolutions TGNC.

Thus, the smaller one of the compressor target number of revolutions TGNCh calculated based on the radiator pressure PCI and the compressor target number of revolutions TGNCc calculated based on the heat absorber temperature Te is selected to control the operation of the compressor 2. Consequently, since the compressor target number of revolutions TGNCc becomes relatively small under an environment condition in which, for example, the outdoor air temperature Tam is low, it is selected and the heat absorber temperature Te can be controlled to the target heat absorber temperature TEO being its target value by the control of the operation of the compressor 2. On the other hand, since the compressor target number of revolutions TGNCh becomes relatively small under an environment condition in which the outdoor air temperature Tam is high, it is selected and hence the operation of the compressor 2 is controlled by the radiator pressure PCI (high pressure), whereby the disadvantage that the high pressure of the refrigerant circuit R is excessively raised is eliminated.

(9) Control of Outdoor Expansion Valve 6 by Controller 32 in Dehumidifying and Heating Mode.

Next, description will be made as to control of the outdoor expansion valve 6 in the dehumidifying and heating mode by the controller 32 using FIG. 6. Incidentally, the control of a valve position of the outdoor expansion valve 6 to be described below is control in the normal mode in the dehumidifying and heating mode, which will be described later. The controller 32 compares the heat absorber temperature Te and a basic target heat absorber temperature TEO0. In the embodiment, when the heat absorber temperature Te is lower than the basic target heat absorber temperature TEO0, the controller 32 adjusts a target valve position (a target outdoor expansion valve position TGECCV) of the outdoor expansion valve 6 to the maximum valve position TGECCVteLimHi (e.g., 300PLS: large bore mode) of controlling. When the heat absorber temperature Te is higher than the basic target heat absorber temperature TEO0, the controller 32 adjusts the target valve position to the minimum valve position TGECCVteLimLo (e.g., 100PLS: small bore mode) of controlling.

Figure 8:
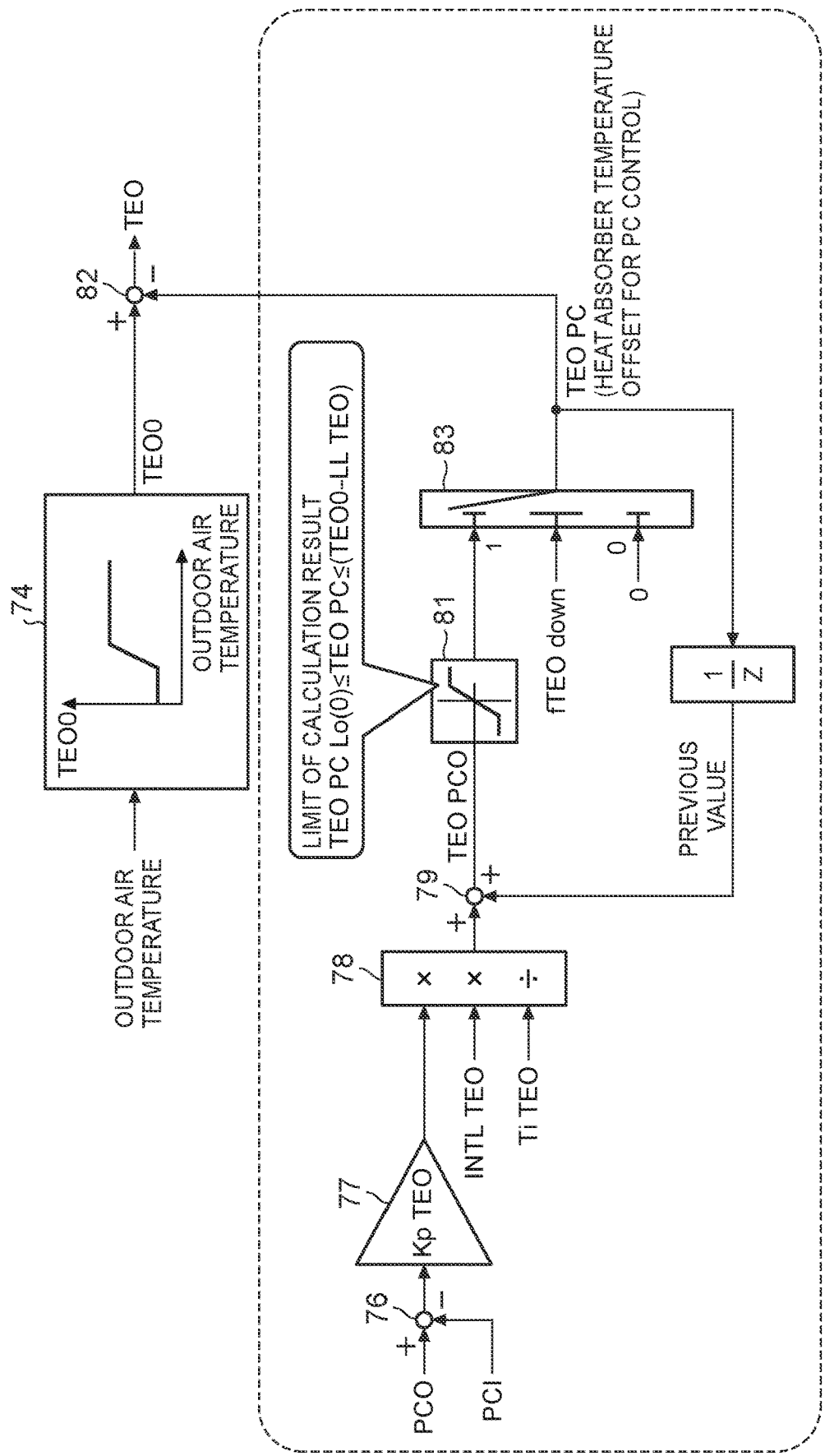
FIG. 8 is a control block diagram concerning control of a target heat absorber temperature TEO in the dehumidifying and heating mode by the controller of FIG. 2.

Incidentally, reference numeral 74 shown in FIG. 8 denotes a data table of the above basic target heat absorber temperature TEO0. This is predetermined corresponding to the outdoor air temperature in the embodiment. The basis target heat absorber temperature TEO0 is a heat absorber temperature to obtain a humidity required in the environment of the outdoor air temperature.

Figure 6:
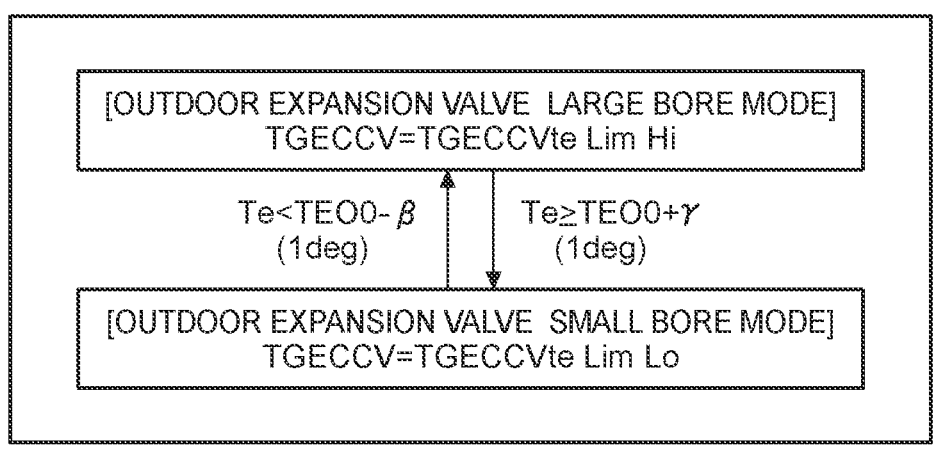
FIG. 6 is a view to describe outdoor expansion valve control in the dehumidifying and heating mode by the controller of FIG. 2.

However, in actuality, the controller sets predetermined hysteresis values $\beta$ and $\gamma$ (both being, for example, 1 deg) above and below the basic target heat absorber temperature TEO0 to perform the control as shown in FIG. 6 for the purpose of preventing or inhibiting control hunting. Specifically, when the heat absorber temperature Te drops to be lower than the basic target heat absorber temperature TEO0—the hysteresis value $\beta$, the controller changes the valve position of the outdoor expansion valve 6 in the enlarging direction as much as the constant value (a constant pulse number) to adjust the valve position to the maximum valve position TGECCVteLimHi (the large bore) of controlling.

Consequently, since the refrigerant flowing through the refrigerant pipe 13J into the outdoor heat exchanger 7 increases, and the refrigerant flowing through the refrigerant pipe 13F to reach the heat absorber 9 decreases, an amount of the refrigerant to evaporate in the heat absorber 9 decreases, and the heat absorber temperature Te rises. Afterward, when the heat absorber temperature Te is raised to rise to the basic target heat absorber temperature TEO0+the hysteresis value $\gamma$ or more, the controller changes the valve position of the outdoor expansion valve 6 in the reducing direction as much as the above-mentioned constant value (the constant pulse number) to adjust the valve position to the minimum valve position TGECCVteLimLo (the small bore) of controlling.

In consequence, since the refrigerant flowing through the refrigerant pipe 13J into the outdoor heat exchanger 7 decreases, and the refrigerant flowing through the refrigerant pipe 13F to reach the heat absorber 9 increases, the amount of the refrigerant to evaporate in the heat absorber 9 increases, and the heat absorber temperature Te turns to drop. Afterward, the controller repeats this control in the normal mode to be described later, and controls the heat absorber temperature Te to the basic target heat absorber temperature TEO0 (in actuality, a temperature in the vicinity of the basic target heat absorber temperature TEO0 which is in a range of the upper and lower hysteresis values $\beta$ and $\gamma$ of the basic target heat absorber temperature TEO0).

Figure 7:
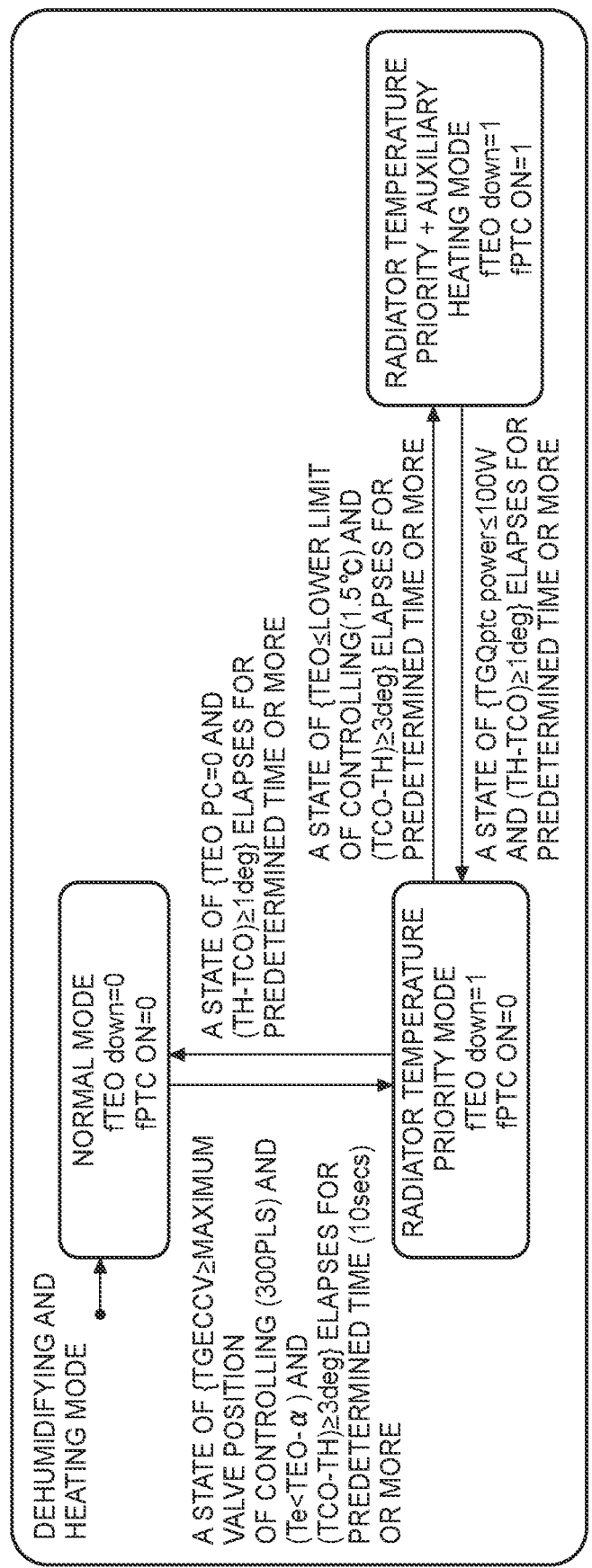
FIG. 7 is a view to explain change control of a normal mode, a radiator temperature priority mode, and a radiator temperature priority+auxiliary heating mode in the dehumidifying and heating mode by the controller of FIG. 2.

(10) Changing Control of Normal Mode and Radiator Temperature Priority Mode in Dehumidifying and Heating Mode Next, description will be made as to change control of the normal mode and the radiator temperature priority mode in the above-described dehumidifying and heating mode using FIGS. 7 through 9. As described above, in the dehumidifying and heating mode, the controller selects the smaller one of the compressor target number of revolutions TGNCh calculated based on the radiator pressure PCI and the compressor target number of revolutions TGNCc calculated based on the heat absorber temperature Te to control the operation of the compressor 2. Therefore, when the compressor target number of revolutions TGNCc s selected in the normal mode in the environment in which the outdoor air temperature Tam is low, the heat absorber temperature Te converges on the target heat absorber temperature TEO, and the high pressure of the refrigerant circuit R is not raised even in a state in which the valve position of the outdoor expansion valve 6 is brought to the above-described maximum valve position TGECCVteLimHi of controlling. When the radiator pressure PCI does not reach the target radiator pressure PCO, the heat radiation (the radiator temperature TCI) in the radiator 4 falls into a state in which it runs short.

Thus, in such a case, the controller 32 executes the radiator temperature priority mode of lowering the target heat absorber temperature TEO to increase the number of revolutions of the compressor 2, enhancing the capability of the compressor 2 to raise the high pressure, and raising the radiator pressure PCI to the target radiator pressure PCO. FIG. 7 illustrates mode change control between the normal mode and radiator temperature priority mode in the dehumidifying and heating mode. The controller 32 shifts to the radiator temperature priority mode where {a state in which the valve position of the outdoor expansion valve 6 becomes the maximum valve position TGECCVteLimHi of controlling or more, the heat absorber temperature Te becomes lower than the target heat absorber temperature TEO—the hysteresis value $\alpha$, and the target heater temperature TCO—the heating temperature TH becomes, for example, 3 deg or more (i.e., the heat radiation in the radiator 4 runs short)} elapses for a predetermined time (e.g., 10 secs) or more when the controller 32 executes the normal mode (TEO down permission flag fTEOdown=0"reset", and an auxiliary heater heat generation permission flag fPTCON=0) in the dehumidifying and heating mode (TEO down permission flag fTEOdown=1"set", and auxiliary heater heat generation permission flag fPTCON=0).

Incidentally, the controller 32 fixes the target valve position TGECCV of the outdoor expansion valve 6 to the above-mentioned maximum valve position TGECCVteLimHi of controlling in the radiator temperature priority mode.

FIG. 8 shows one example of a control block diagram of the controller 32 in this radiator temperature priority mode. That is, reference numeral 74 of FIG. 8 denotes a data table of the above-described basic target heat absorber temperature TEO0, and this table is predetermined corresponding to the outdoor air temperature in the embodiment. The basic target heat absorber temperature TEO0 is a heat absorber temperature to obtain a humidity required in the environment of the outdoor air temperature. Incidentally, in the embodiment, the basic target heat absorber temperature TEO0 is calculated from the outdoor air temperature, but is not limited thereto. The basic target heat absorber temperature TEO0 (in that case, a heat absorber temperature to obtain a humidity required in an environment of the outdoor air temperature, indoor air temperature, indoor air humidity or a dewpoint temperature inside a window glass) may be calculated from any of the outdoor air temperature, indoor air temperature (the temperature of the air in the vehicle interior), indoor air humidity (the humidity of the air in the vehicle interior), and the dewpoint temperature inside the window glass (front glass or the like) of the vehicle, or a combination of those, or all of them. The above dewpoint temperature is calculated based on the temperature of the window glass, the indoor air temperature and the indoor air humidity, but in that case, a temperature sensor to detect the temperature of the window glass is provided separately, or the dewpoint temperature is estimated from the outdoor air temperature. Then, normally, the basic target heat absorber temperature TEO0 calculated from the outdoor air temperature is determined as the target heat absorber temperature TEO on the basis of the data table 74 of FIG. 8 in the embodiment, but in this radiator temperature priority mode, the controller 32 adds an offset on the basis of an integrated value of a difference between the target radiator pressure PCO and the radiator pressure PCI.

That is, the target radiator pressure PCO and the radiator pressure PCI obtainable from the radiator pressure sensor 47 are input into a subtractor 76, and the difference e (PCO−PCI) is amplified by an amplifier 77 to be input into a calculator 78. The calculator 78 performs an integral calculation of a heat absorber temperature offset for an integration time in a predetermined integration period (integral control that may be a differential integration), and an adder 79 adds the previous value to calculate an integrated value TEOPCO of the heat absorber temperature offset. Then, a limit setting section 81 attaches limits of an upper limit of controlling and a lower limit of controlling, and then a heat absorber temperature offset TEOPC is determined.

The heat absorber temperature offset TEOPC is input to a changer 83. The changer 83 is switched by set/reset of the aforementioned TEO down permission flag fTEOdown. When the TEO down permission flag fTEOdown=1 (set), a heat absorber temperature offset TEOPC after attachment of limits of a lower limit of controlling (TEOPCLo(0)) and an upper limit of controlling (TEO0-LLTEO) by the limit setting section 81 is output from the changer 83. When the TEO down permission flag fTEOdown=0 (reset), a heat absorber temperature offset TEOPC=0 is output from the changer 83.

Since the TEO down permission flag fTEOdown=1 (set) in the radiator temperature priority mode, the heat absorber temperature offset TEOPC after attachment of the limits of the upper limit of controlling and the lower limit of controlling by the limit setting section 81 is output and subtracted from the basic target heat absorber temperature TEO0 in a subtractor 82 to be determined as the target heat absorber temperature TEO. Therefore, the target heat absorber temperature TEO is lowered than in the normal mode as much as the heat absorber temperature offset TEOPC, the compressor target number of revolutions TGNCc of the compressor 2 thus increases, the number of revolutions NC of the compressor 2 increases, the capability of the compressor 2 increases to raise the high pressure, and the radiator pressure PCI rises so that the required radiation capability (radiator temperature TCI) of the radiator 4 is obtainable.

Incidentally, LLTEO (e.g., +1.5° C.) in the limit setting section 81 is a lower limit of controlling of the target heat absorber temperature TEO and means a lower limit of a range in which the heat absorber 9 is not frosted. Consequently, the target heat absorber temperature TEO offset by the heat absorber temperature offset TEOPC does not fall below the lower limit LLTEO of controlling.

On the other hand, in the radiator temperature priority mode, when {a state in which the above-described heat absorber temperature offset TEOPC becomes zero (0), and the heating temperature TH—the target heater temperature TCO becomes higher than, for example, 1 deg (i.e., the heat radiation of the radiator 4 becomes excessive)} elapses for a predetermined time (e.g., 10 secs) or more, the controller 32 returns from the radiator temperature priority mode to the normal mode (TEO down permission flag fTEOdown=0 and the auxiliary heater heat generation permission flag fPTCON=0). Since the TEO down permission flag fTEOdown=0 due to the return to the normal mode, a heat absorber temperature offset TEOPC of "0" is output from the changer 83 of FIG. 8, so that the control to lower the target heat absorber temperature TEO is completed, and the basic target heat absorber temperature TEO0 becomes the target heat absorber temperature TEO.

Figure 9:
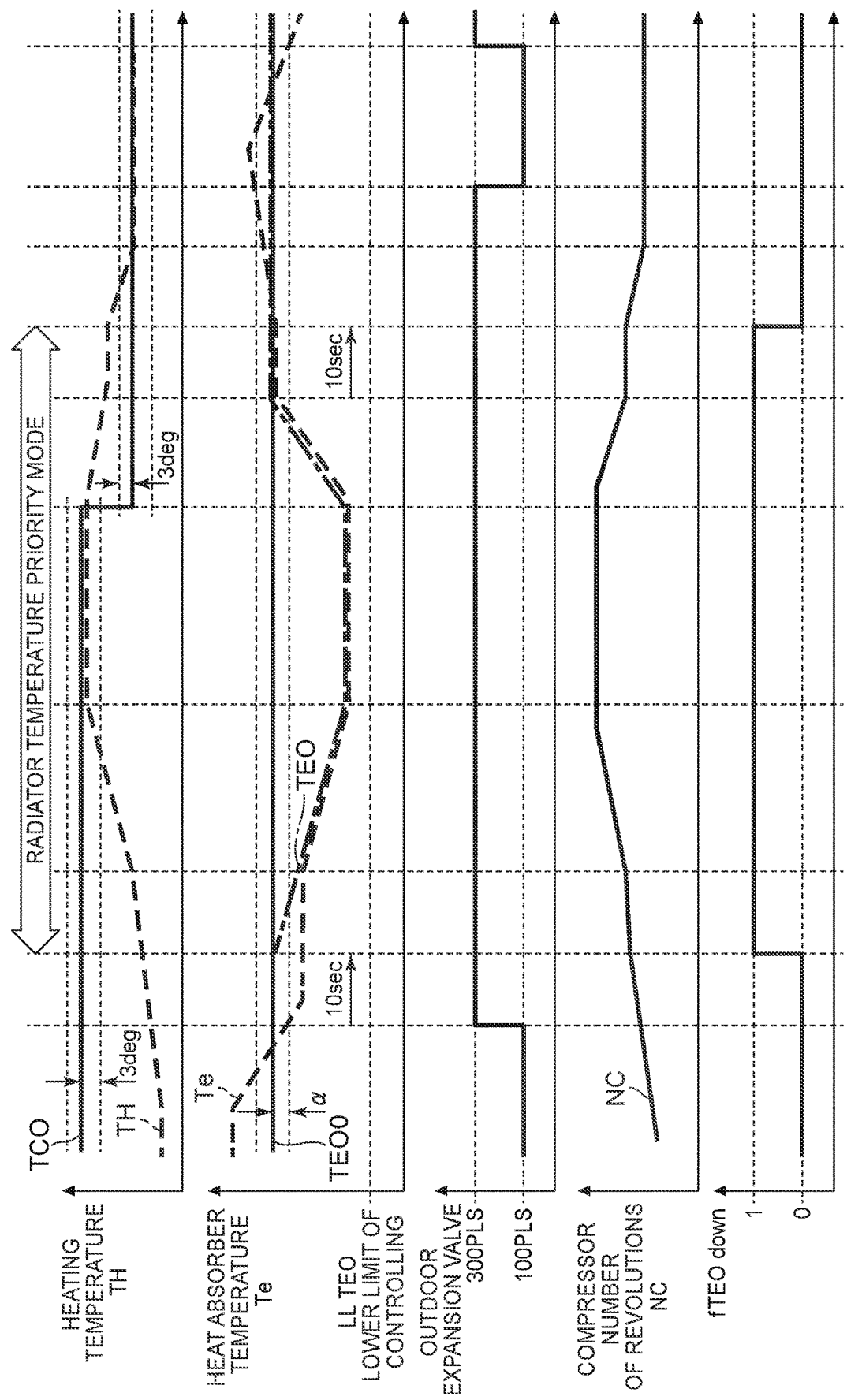
FIG. 9 is a timing chart illustrating change control of the normal mode and the radiator temperature priority mode in the dehumidifying and heating mode by the controller of FIG. 2.

FIG. 9 is a timing chart to describe the manner of changing of such a normal mode and a radiator temperature priority mode. In the normal mode, when a situation in which the valve position of the outdoor expansion valve 6 becomes the maximum valve position TGECCVteLimHi (300PLS) of controlling, the heat absorber temperature Te becomes lower than the target heat absorber temperature TEO—the hysteresis value α, and the target heater temperature TCO—the heating temperature TH becomes, for example, 3 deg or more (i.e., the heat radiation in the radiator 4 runs short) elapses for a predetermined time (10 secs), the controller 32 shifts to the radiator temperature priority mode.

It can be seen that when the controller shifts to the radiator temperature priority mode, and the target heat absorber temperature TEO is lowered as described above, the number of revolutions NC of the compressor 2 is raised and the heat absorber temperature Te is lowered, and the heating temperature TH rises to the target heater temperature TCO. Thereafter, when the target outlet temperature TAO drops, and the target heater temperature TCO is lowered, the target radiator pressure PCO is also lowered and hence the difference e between the target radiator pressure PCO and the radiator pressure PCI becomes small or is reversed, so that the heat absorber temperature offset TEOPC becomes smaller and reaches zero (TEOPC=0) later on, thereby causing the target heat absorber temperature TEO to assume the basic target heat absorber temperature TEO0. Then, when a state in which the heat absorber temperature offset TEOPC=0, and the heating temperature TH—the target heater temperature TCO becomes 3 deg or more elapses for a predetermined time (10 secs), the controller 32 returns from the radiator temperature priority mode to the normal mode.

Incidentally, the change control of such a normal mode and a radiator temperature priority mode can similarly be applied even to the case where the number of revolutions NC of the compressor 2 is controlled using the compressor target number of revolutions TGNCc in the internal cycle mode.

Thus, in the dehumidifying and heating mode, when the heat radiation in the radiator 4 runs short when the controller 32 controls the operation of the compressor 2 on the basis of the heat absorber temperature Te, the controller executes the radiator temperature priority mode to enlarge the capability of the compressor 2. Therefore, in the dehumidifying and heating mode as in the embodiment, when in the state in which the valve position of the outdoor expansion valve 6 is at the maximum valve position of controlling, the heat absorber temperature Te converges on the target heat absorber temperature TEO, and the heat radiation in the radiator 4 runs short, the controller executes the radiator temperature priority mode to enlarge the capability of the compressor 2 to raise the high pressure, thereby making it possible to increase the amount of heat radiation of the refrigerant in the radiator 4.

Consequently, for example, even when the outdoor air temperature Tam is lowered so that the heat absorber temperature Te is reduced when the operation of the compressor 2 is controlled on the basis of the heat absorber temperature Te in the dehumidifying and heating mode, it is possible to ensure the heating capability by the radiator 4 and maintain air conditioning performance, thereby making it possible to enlarge an effective range of the dehumidifying and heating mode to achieve comfortable vehicle interior air conditioning. This is effective specially in the case where no evaporation pressure control valve is provided on the refrigerant outlet side of the heat absorber 9 as in the embodiment.

Further, in the normal mode of the dehumidifying and heating mode as in the embodiment, if the controller shifts to the radiator temperature priority mode where in the state in which the valve position of the outdoor expansion valve 6 becomes the maximum valve position of controlling, the heat absorber temperature Te converges on the target heat absorber temperature TEO, and the heat radiation in the radiator 4 runs short, the controller is capable of appropriately grasping a situation in which the lowering of the heat absorber temperature Te cannot be prevented due to the valve position of the outdoor expansion valve 6, and the heat radiation in the radiator 4 runs short, and thereby shifting to the radiator temperature priority mode to enlarge the capability of the compressor 2 to raise the high pressure, thereby increasing the amount of heat radiation of the refrigerant in the radiator 4.

Particularly, in the embodiment, when the controller 32 controls the operation of the compressor 2 on the basis of the heat absorber temperature Te in the radiator temperature priority mode, the controller lowers the target heat absorber temperature TEO being the target value of the heat absorber temperature Te to enlarge the capability of the compressor 2. It is therefore possible to enlarge the capability of the compressor 2 to thereby increase the amount of heat radiation in the radiator 4 while adequately controlling the heat absorber temperature Te.

Also, in the embodiment, since the target heat absorber temperature TEO is reduced according to the difference e between the radiator pressure PCI and the target radiator pressure PCO, the controller 32 is capable of grasping based on the difference e between the radiator pressure PCI and the target radiator pressure PCO that the heat radiation in the radiator runs short, appropriately reducing the target heat absorber temperature TEO and increasing the amount of heat radiation in the radiator 4 accurately, thereby contributing even to energy saving.

Further, in the embodiment, since the basic target heat absorber temperature TEO0 calculated from the outdoor air temperature is offset by the heat absorber temperature offset TEOPC calculated based on the difference e between the radiator pressure PCI and the target radiator pressure PCO to reduce the target heat absorber temperature TEO, the controller 32 is capable of appropriately lowering the target heat absorber temperature TEO with the basic target heat absorber temperature TEO0 as a base.

In addition, in the embodiment, the controller 32 lowers the target heat absorber temperature TEO so as not to fall below the lower limit LTEO of controlling of the target heat absorber temperature TEO. Therefore, it is also possible to avoid the disadvantage that the target heat absorber temperature TEO is excessively lowered to cause frost attaching to the heat absorber 9.

(11) Change Control of Radiator Temperature Priority Mode and Radiator Temperature Priority+Auxiliary Heating Mode in Dehumidifying and Heating Mode Here, when the heating temperature TH does not rise to the target heater temperature TCO even by the increase in the number of revolutions of the compressor 2 with the lowering of such a heat absorber target temperature TEO (the heat radiation in the radiator 4 runs short), the controller 32 utilizes the auxiliary heater 23. There is also shown in FIG. 7, change control of the radiator temperature priority+ auxiliary heating mode and the above-described radiator temperature priority mode by cooperative control with such an auxiliary heater 23.

That is, when in the aforementioned radiator temperature priority mode (TEO down permission flag fTEOdown=1 and auxiliary heater heat generation permission flag fPTCON=0), {a state in which the target heat absorber temperature TEO becomes the lower limit LLTEO of controlling or less, and the target heater temperature TCO—heating temperature TH becomes, for example, 3 deg or more (i.e., the heat radiation in the radiator 4 runs short)} elapses for a predetermined time or more, the controller 32 shifts to the radiator temperature priority+auxiliary heating mode (TEO down permission flag fTEOdown=1 and auxiliary heater heat generation permission flag fPTCON=1).

The controller 32 lets the auxiliary heater 23 generate heat in this radiator temperature priority+auxiliary heating mode. In that case, for example, the controller 32 amplifies the difference e between the target heater temperature TCO (which may be the target radiator pressure PCO) and the heating temperature TH (which may be the radiator pressure PCI) (integral calculation or differential integral calculation) to calculate a target auxiliary heater power TGQptcpower being a target value of power of the auxiliary heater 23. Then, the controller 32 controls energization to the auxiliary heater 23 by the target auxiliary heater power TGQptcpower to generate heat.

Thus, the auxiliary heater 23 complements the shortage of heat radiation in the radiator 4. When the heat radiation in the radiator 4 runs short even if the target heat absorber temperature TEO is lowered to the lower limit LLTEO of controlling in the radiator temperature priority mode in this manner, the auxiliary heater 23 is caused to generate heat, whereby when the shortage of the heat radiation of the radiator 4 cannot be eliminated by an increase in the capability of the compressor 2, the air supplied to the vehicle interior is heated by the auxiliary heater 23, so that comfortable dehumidifying and heating can be maintained.

When in such a radiator temperature priority+auxiliary heating mode, {a state in which the target auxiliary heater power TGQptcpower is lowered to, for example, 100 W (predetermined value) or less, and the heating temperature TH—target heater temperature TCO becomes, for example, 1 deg or more (i.e., heating capability becomes excessive)} elapses for a predetermined time or more, the controller 32 returns to the radiator temperature priority mode (TEO down permission flag fTEOdown=1, and the auxiliary heater heat generation permission flag fPTCON=0).

(12) Change Control from Dehumidifying and Heating Mode to Dehumidifying Cooling Mode Further, even if the valve position of the outdoor expansion valve 6 becomes the minimum valve position TGECCVteLimLo (100PLS: small bore mode) of controlling in the normal mode (i.e., a state in which there is no need to execute the radiator temperature priority mode) in the dehumidifying and heating mode as described above, the controller 32 changes the operation mode to the aforementioned dehumidifying and cooling mode where the heat absorber temperature Te is higher than the target heat absorber temperature TEO due to the rise in the outdoor air temperature Tam or the like (e.g., TEO>TEO0+α).

Thus, if the controller changes the operation mode to the dehumidifying and cooling mode where the heat absorber temperature Te is higher than the target heat absorber temperature TEO even if the valve position of the outdoor expansion valve 6 becomes the minimum valve position, the controller shifts to the dehumidifying and cooling mode when the target heat absorber temperature TEO cannot be attained by the valve position of the outdoor expansion valve 6 due to the rise in the outdoor air temperature or the like, to enlarge cooling capability by the heat absorber 9, thereby enabling comfortable vehicle interior air conditioning to continue smoothly.

(13) Another Example of Determination of Compressor Target Number of Revolutions TGNC in Dehumidifying and Heating Mode Incidentally, in the aforementioned embodiment, in the dehumidifying and heating mode, the controller 32 selects the smaller one of the compressor target number of revolutions TGNCh calculated based on the radiator pressure PCI and the compressor target number of revolutions TGNCc calculated based on the heat absorber temperature Te and determines the same as the compressor target number of revolutions TGNC (FIG. 5), but the compressor target number of revolutions is not limited thereto. In the aforementioned normal mode, the controller determines the compressor target number of revolutions TGNCh calculated based on the radiator pressure PCI as the compressor target number of revolutions TGNC. Only in the radiator temperature priority mode, the controller may select the smaller one of the compressor target number of revolutions TGNCh and the compressor target number of revolutions TGNCc and determine the same as the compressor target number of revolutions TGNC.

Figure 10:
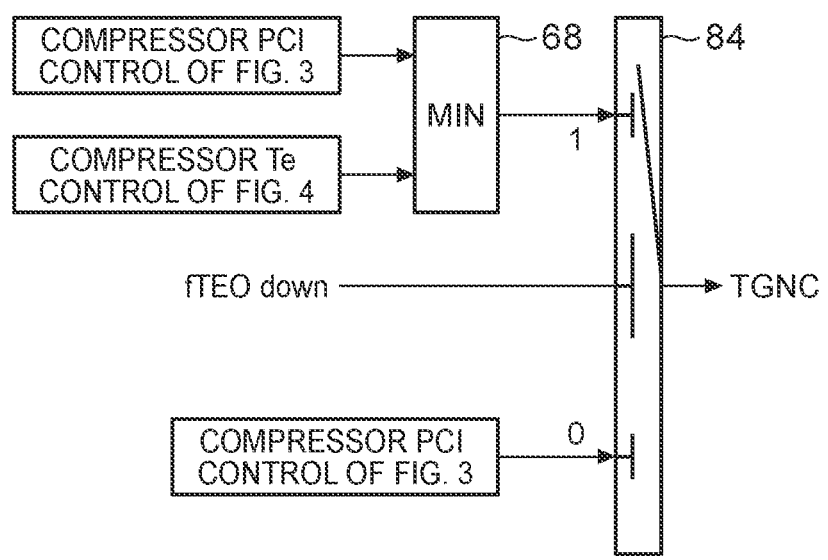
FIG. 10 is a further control block diagram concerning determination of a compressor target number of revolutions in the dehumidifying and heating mode by the controller of FIG. 2.

A control block in that case is shown in FIG. 10. In FIG. 10, an output of the comparison section 68 in FIG. 4 is input to the changer 84. The changer 84 is also switched by set/reset of the TEO down permission flag fTEOdown. In the normal mode in which the TEO down permission flag fTEOdown=0 (reset), the compressor target number of revolutions TGNCh calculated based on the radiator pressure PCI is output from the changer 84 as the compressor target number of revolutions TGNC. In the radiator temperature priority mode in which the TEO down permission flag fTEOdown=1 (set), the smaller one of the compressor target number of revolutions TGNCh and the compressor target number of revolutions TGNCc determined by the comparison section 68 is output from the changer 84 as the compressor target number of revolutions TGNC. The number of revolutions NC of the compressor 2 is controlled based on this compressor target number of revolutions TGNC.

Thus, even if in the normal mode of the dehumidifying and heating mode, the compressor target number of revolutions TGNCh calculated based on the radiator pressure PCI is determined as the compressor target number of revolutions TGNC, and in the radiator temperature priority mode, the smaller one of the compressor target number of revolutions TGNCh and the compressor target number of revolutions TGNCc calculated based on the heat absorber temperature Te is selected to control the operation of the compressor 2, the compressor target number of revolutions TGNCc becomes relatively small in the radiator temperature priority mode switched when the outdoor air temperature Tam assumes a low environmental condition, and hence the compressor target number of revolutions is selected, so that the heat absorber temperature Te can be controlled to the target heat absorber temperature TEO being its target value by the operation control of the compressor 2. Further, since the compressor target number of revolutions TGNCh becomes relatively small where the outdoor air temperature Tam becomes high in the radiator temperature priority mode, the compressor target number of revolutions TGNCh is selected, so that the disadvantage is eliminated that the operation of the compressor 2 is controlled by the radiator pressure PCI (high pressure), and the high pressure of the refrigerant circuit R is excessively raised.

On the other hand, since the compressor target number of revolutions TGNCh becomes relatively small even in the normal mode to be executed when the outdoor air temperature Tam assumes a high environmental condition, the compressor target number of revolutions TGNCh is selected, so that the disadvantage is eliminated that the operation of the compressor 2 is controlled by the radiator pressure PCI (high pressure), and similarly, the high pressure of the refrigerant circuit R is excessively raised.

(14) Further Example of Determination of Compressor Target Number of Revolutions TGNC in Dehumidifying and Heating Mode Here, in the respective embodiments described above, in the dehumidifying and heating mode, the controller 32 selects the smaller one of the compressor target number of revolutions TGNCh calculated based on the radiator pressure PCI and the compressor target number of revolutions TGNCc calculated based on the heat absorber temperature Te and determines the same as the compressor target number of revolutions TGNC (FIG. 5), or in the normal mode, determines the compressor target number of revolutions TGNCh calculated based on the radiator pressure PCI as the compressor target number of revolutions TGNC, and only in the radiator temperature priority mode, selects the smaller one of the compressor target number of revolutions TGNCh and the compressor target number of revolutions TGNCc and determines the same as the compressor target number of revolutions TGNC (FIG. 10), but the compressor target number of revolutions is not limited thereto. During the dehumidifying and heating mode, the compressor target number of revolutions TGNCc calculated based on the heat absorber temperature Te may be determined as the compressor target number of revolutions TGNC to control the compressor 2.

(15) Another Example of Lowering Control of Target Heat Absorber Temperature TEO Further, in the embodiment (control block of FIG. 8), the target heat absorber temperature TEO is made low by the integration based on the difference e between the target radiator pressure PCO and the radiator pressure PCI, or its differential integration control, but is not limited thereto. The target heat absorber temperature TEO may be lowered stepwise according to the same difference e. Furthermore, when the difference e (PCO-PCI) is a predetermined value or more, the target heat absorber temperature TEO may be fixed to the aforementioned lower limit LLTEO of controlling (+1.5° C.)

Incidentally, in the above-mentioned embodiment (FIG. 7), the changing of the normal mode, radiator temperature priority mode, and radiator temperature priority+auxiliary heating mode in the dehumidifying and heating mode is performed by the difference (TCO-TH or TH-TCO) between the target heater temperature TCO and the heating temperature TH, but is not limited thereto. Whether the amount of heat radiation of the radiator 4 runs short is determined based on the difference (PCO-PCI or PCI-PCO) between the target radiator pressure PCO and the radiator pressure PCI, and the changing of the modes may be performed.

It is needless to say that the constitution or each numeric value of the refrigerant circuit R described above in the embodiment does not restrict the present invention, and is changeable without departing from the gist of the present invention.

DESCRIPTION OF REFERENCE NUMERALS

1 vehicle air-conditioning apparatus
2 compressor 3 air flow passage
4 radiator
6 outdoor expansion valve
7 outdoor heat exchanger
8 indoor expansion valve
9 heat absorber
13F refrigerant pipe (bypass circuit)
17, 21, 22 solenoid valve
23 auxiliary heater (auxiliary heating device)
27 indoor blower (blower fan)
28 air mix damper
32 controller (control device)
R refrigerant circuit.

The invention claimed is:

1. A vehicle air-conditioning apparatus comprising:
a compressor to compress a refrigerant;
an air flow passage through which air to be supplied to a vehicle interior flows;
a radiator to let the refrigerant radiate heat, thereby heating the air to be supplied from the air flow passage to the vehicle interior;
a heat absorber to let the refrigerant absorb heat, thereby cooling the air to be supplied from the air flow passage to the vehicle interior;
an outdoor heat exchanger disposed outside the vehicle interior to let the refrigerant absorb heat;
an outdoor expansion valve to decompress the refrigerant flowing into the outdoor heat exchanger;
a bypass circuit connected in parallel with a series circuit of the outdoor heat exchanger and the outdoor expansion valve;
an indoor expansion valve to decompress the refrigerant flowing into the heat absorber; and
a control device,
whereby the control device executes at least a dehumidifying and heating mode to let the refrigerant discharged from the compressor radiate heat in the radiator, distribute the refrigerant from which the heat has been radiated, let a part of the refrigerant flow into the indoor expansion valve from the bypass circuit, decompress the refrigerant in the indoor expansion valve, and then let the refrigerant flow into the heat absorber to let the refrigerant absorb heat in the heat absorber, and decompress the residual refrigerant through the outdoor expansion valve, and then let the refrigerant flow into the outdoor heat exchanger to let the refrigerant absorb heat in the outdoor heat exchanger,
wherein in the dehumidifying and heating mode, the control device controls the operation of the compressor on the basis of a heat absorber temperature Te of the heat absorber or has a state of controlling the operation of the compressor on the basis of the heat absorber temperature Te, and
wherein when heat radiation in the radiator runs short, the control device executes a radiator temperature priority mode to enlarge a capability of the compressor.

2. The vehicle air-conditioning apparatus according to claim 1, wherein in the dehumidifying and heating mode, the control device selects a smaller one of a target number of revolutions TGNCh of the compressor calculated based on a radiator pressure PCI of the radiator, and a target number of revolutions TGNCc of the compressor calculated based on the heat absorber temperature Te to control the operation of the compressor.

3. The vehicle air-conditioning apparatus according to claim 1, wherein when in the dehumidifying and heating mode, the heat absorber temperature Te converges on a target heat absorber temperature TEO, and heat radiation in the radiator runs short in a state in which a valve position of the outdoor expansion valve becomes a maximum valve position of controlling, the control device executes the radiator temperature priority mode.

4. The vehicle air-conditioning apparatus according to claim 1, wherein in the dehumidifying and heating mode, the control device executes a normal mode to control the operation of the compressor on the basis of a radiator pressure PCI of the radiator and to control a valve position of the outdoor expansion valve on the basis of the heat absorber temperature Te,
wherein when in the normal mode, the heat absorber temperature Te converges on a target heat absorber temperature TEO, and heat radiation in the radiator runs short in a state in which the valve position of the outdoor expansion valve becomes a maximum valve position of controlling, the control device shifts to the radiator temperature priority mode, and
wherein in the radiator temperature priority mode, the control device selects a smaller one of a target number of revolutions TGNCh of the compressor calculated based on a radiator pressure PCI of the radiator, and a target number of revolutions TGNCc of the compressor calculated based on the heat absorber temperature Te to control the operation of the compressor.

5. The vehicle air-conditioning apparatus according to claim 1, wherein in the radiator temperature priority mode, the control device controls the operation of the compressor on the basis of the heat absorber temperature Te, and lowers a target heat absorber temperature TEO value of the heat absorber temperature Te to enlarge the capability of the compressor.

6. The vehicle air-conditioning apparatus according to claim 5, wherein the control device lowers the target heat absorber temperature TEO according to a difference between a radiator pressure PCI of the radiator and a target radiator pressure PCO of the radiator pressure PCI.

7. The vehicle air-conditioning apparatus according to claim 6, wherein the control device offsets a basic target heat absorber temperature TEO0 calculated from any of an outdoor air temperature, a temperature of the air in the vehicle interior, a humidity of the air in the vehicle interior, and a dewpoint temperature inside a window glass of a vehicle, or a combination of those, or all of them by a heat absorber temperature offset TEOPC calculated based on the difference between the radiator pressure PCI and the target radiator pressure PCO to thereby lower the target heat absorber temperature TEO.

8. The vehicle air-conditioning apparatus according to claim 5, wherein the control device lowers the target heat absorber temperature TEO so as not to fall below a lower limit of controlling of the target heat absorber temperature TEO.

9. The vehicle air-conditioning apparatus according to claim 5, including an auxiliary heating device to heat the air to be supplied from the air flow passage to the vehicle interior,
wherein when in the radiator temperature priority mode, heat radiation in the radiator runs short even when the target heat absorber temperature TEO is lowered to a lower limit of controlling of the target heat absorber temperature TEO, the control device operates the auxiliary heating device to generate heat.

10. The vehicle air-conditioning apparatus according to claim 1, wherein the control device has a dehumidifying and cooling mode to let the refrigerant discharged from the compressor radiate heat in the radiator and the outdoor heat exchanger, decompress the refrigerant from which the heat has been radiated by operating the indoor expansion valve, and then let the refrigerant flow into the heat absorber to thereby let the refrigerant absorb heat in the heat absorber, and wherein when in a state in which there is no need to execute the radiator temperature priority mode, the heat absorber temperature Te is higher than a target heat absorber temperature TEO being the target value of the heat absorber temperature Te even if a valve position of the outdoor expansion valve becomes a minimum valve position of controlling, the control device changes to the dehumidifying and cooling mode.

11. The vehicle air-conditioning apparatus according to claim 1, wherein an evaporation pressure control valve is not provided on a refrigerant outlet side of the heat absorber.

* * * * *